(12) United States Patent
Shimizu et al.

(10) Patent No.: US 9,890,324 B2
(45) Date of Patent: Feb. 13, 2018

(54) PHOTOCHROMIC CURABLE COMPOSITION, CURED PRODUCT THEREOF AND LAMINATE INCLUDING THE CURED PRODUCT

(71) Applicant: TOKUYAMA CORPORATION, Shunan-shi, Yamaguchi (JP)

(72) Inventors: Yasutomo Shimizu, Shunan (JP); Junji Takenaka, Shunan (JP); Junji Momoda, Shunan (JP); Katsuhiro Mori, Shunan (JP)

(73) Assignee: TOKUYAMA CORPORATION, Shunan-shi (JP)

( * ) Notice: Subject to any disclaimer, the term of this patent is extended or adjusted under 35 U.S.C. 154(b) by 89 days.

(21) Appl. No.: 14/770,181

(22) PCT Filed: Feb. 26, 2014

(86) PCT No.: PCT/JP2014/055527
§ 371 (c)(1),
(2) Date: Aug. 25, 2015

(87) PCT Pub. No.: WO2014/136804
PCT Pub. Date: Sep. 12, 2014

(65) Prior Publication Data
US 2016/0002524 A1 Jan. 7, 2016

(30) Foreign Application Priority Data

Mar. 4, 2013 (JP) .................................. 2013-041975
Jul. 26, 2013 (JP) .................................. 2013-155590

(51) Int. Cl.
| | | |
|---|---|---|
| B32B 27/30 | (2006.01) | |
| C09K 9/02 | (2006.01) | |
| C08F 220/28 | (2006.01) | |
| C08F 2/50 | (2006.01) | |
| G02C 7/10 | (2006.01) | |
| C08F 290/06 | (2006.01) | |
| G02B 1/10 | (2015.01) | |
| G02B 5/22 | (2006.01) | |
| G02B 5/23 | (2006.01) | |

(52) U.S. Cl.
CPC .................. *C09K 9/02* (2013.01); *C08F 2/50* (2013.01); *C08F 220/28* (2013.01); *C08F 290/061* (2013.01); *G02B 1/10* (2013.01); *G02B 5/223* (2013.01); *G02B 5/23* (2013.01); *G02C 7/102* (2013.01); *C09K 2211/1088* (2013.01); *C09K 2211/1425* (2013.01)

(58) Field of Classification Search
CPC ... C09K 9/02; G02B 1/10; G02B 5/22; G02B 5/23; G02B 5/223; G02C 7/10
See application file for complete search history.

(56) References Cited

U.S. PATENT DOCUMENTS

| | | |
|---|---|---|
| 5,645,767 A | 7/1997 | Van Gemert |
| 5,658,501 A | 8/1997 | Kumar et al. |
| 5,961,892 A | 10/1999 | Van Gemert et al. |
| 6,296,785 B1 | 10/2001 | Nelson et al. |
| 2005/0089630 A1 | 4/2005 | Schlunt et al. |
| 2007/0045596 A1 | 3/2007 | King et al. |
| 2008/0225400 A1 | 9/2008 | Swarup et al. |

FOREIGN PATENT DOCUMENTS

| | | |
|---|---|---|
| EP | 1 130 038 A1 | 9/2001 |
| JP | 62-288830 A | 12/1987 |
| JP | 2-28154 A | 1/1990 |
| JP | 8-157467 A | 6/1996 |
| JP | 8-176139 A | 7/1996 |
| JP | 8-295690 A | 11/1996 |

(Continued)

OTHER PUBLICATIONS

International Preliminary Report on Patentability and English translation of the Written Opinion of the International Searching Authority, (Forms PCT/IB/338, PCT/IB/373 and PCT/ISA/237) dated Sep. 17, 2015, for International Application No. PCT/JP2014/055527.
International Search Report, dated May 27, 2014, for International Application No. PCT/JP2014/055527.
Extended European Search Report dated Sep. 23, 2016 for European Application No. 14760178.5.

*Primary Examiner* — Shane Fang
(74) *Attorney, Agent, or Firm* — Birch, Stewart, Kolasch & Birch, LLP

(57) ABSTRACT

A curable composition which comprises a carbonate-based polymerizable monomer represented by the following formula, other polymerizable monomers and a photochromic compound, can be used even under high-temperature and high-humidity conditions without any problems and provides a cured product having excellent photochromic properties.

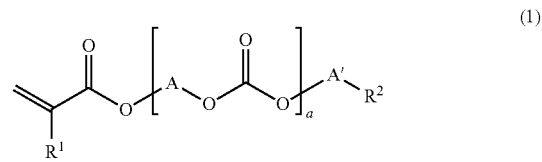

(1)

wherein A and A' are each a linear or branched alkylene group having 2 to 15 carbon atoms, "a" is an average value of 1 to 20, when there are a plurality of A's, A's may be the same or different, $R^1$ is a hydrogen atom or methyl group, and $R^2$ is a (meth)acryloyloxy group or hydroxyl group.

11 Claims, No Drawings

(56) References Cited

FOREIGN PATENT DOCUMENTS

| | | | |
|---|---|---|---|
| JP | 9-124645 A | 5/1997 | |
| JP | 9-218301 A | 8/1997 | |
| JP | 10-298176 A | 11/1998 | |
| JP | 11-279171 A | 10/1999 | |
| JP | 11-286484 A | 10/1999 | |
| JP | 11-322739 A | 11/1999 | |
| JP | 2000-219685 A | 8/2000 | |
| JP | 2000-219686 A | 8/2000 | |
| JP | 2000-219687 A | 8/2000 | |
| JP | 2000-229972 A | 8/2000 | |
| JP | 2000-229973 A | 8/2000 | |
| JP | 2000-229974 A | 8/2000 | |
| JP | 2000-229975 A | 8/2000 | |
| JP | 2000-229976 A | 8/2000 | |
| JP | 2000-256347 A | 9/2000 | |
| JP | 2000-327675 A | 11/2000 | |
| JP | 2000-327676 A | 11/2000 | |
| JP | 2000-344761 A | 12/2000 | |
| JP | 2000-344762 A | 12/2000 | |
| JP | 2000-347346 A | 12/2000 | |
| JP | 2001-11066 A | 1/2001 | |
| JP | 2001-11067 A | 1/2001 | |
| JP | 2001-31670 A | 2/2001 | |
| JP | 2001-114775 A | 4/2001 | |
| JP | 2003-277381 A | 10/2003 | |
| JP | 3471073 B2 | 11/2003 | |
| JP | 3522189 B2 | 4/2004 | |
| JP | 2006070145 * | 9/2004 | ............ C08F 290/16 |
| JP | 2005-112772 A | 4/2005 | |
| JP | 2005-239887 A | 9/2005 | |
| JP | 2005-289807 A | 10/2005 | |
| JP | 2005-289812 A | 10/2005 | |
| JP | 3801386 B2 | 7/2006 | |
| JP | 3982770 B2 | 9/2007 | |
| JP | 2008-74832 A | 4/2008 | |
| JP | 4118458 B2 | 7/2008 | |
| JP | 4157227 B2 | 10/2008 | |
| JP | 4157239 B2 | 10/2008 | |
| JP | 4157245 B2 | 10/2008 | |
| JP | 4158881 B2 | 10/2008 | |
| JP | 2008-297553 A | 12/2008 | |
| JP | 4195615 B2 | 12/2008 | |
| JP | 2009-506193 A | 2/2009 | |
| JP | 2009-57300 A | 3/2009 | |
| JP | 2009-67680 A | 4/2009 | |
| JP | 2009-67754 A | 4/2009 | |
| JP | 4256985 B2 | 4/2009 | |
| JP | 2009-120536 A | 6/2009 | |
| JP | 4301621 B2 | 7/2009 | |
| JP | 4369754 B2 | 11/2009 | |
| JP | 4424962 B2 | 3/2010 | |
| JP | 4424981 B2 | 3/2010 | |
| WO | WO 94/22850 A1 | 10/1994 | |
| WO | WO 96/14596 A1 | 5/1996 | |
| WO | WO 00/71544 A1 | 11/2000 | |
| WO | WO 01/05854 A1 | 1/2001 | |
| WO | WO 01/60811 A1 | 8/2001 | |
| WO | WO 02/090342 A1 | 11/2002 | |
| WO | WO 03/011967 A1 | 2/2003 | |
| WO | WO 03/042203 A1 | 5/2003 | |
| WO | WO 2005/014717 A1 | 2/2005 | |
| WO | WO 2005/028465 A1 | 3/2005 | |
| WO | WO 2007/086532 A1 | 8/2007 | |
| WO | WO 2008/023828 A1 | 2/2008 | |
| WO | WO 2009/075388 A1 | 6/2009 | |
| WO | WO 2009/136668 A1 | 11/2009 | |
| WO | WO 2011/016582 A1 | 2/2011 | |
| WO | WO 2011/034202 A1 | 3/2011 | |
| WO | WO 2012/121414 A1 | 9/2012 | |
| WO | WO 2012/141306 A1 | 10/2012 | |
| WO | WO 2013/002825 A2 | 1/2013 | |
| WO | WO 2013/042800 A1 | 3/2013 | |

* cited by examiner

PHOTOCHROMIC CURABLE COMPOSITION, CURED PRODUCT THEREOF AND LAMINATE INCLUDING THE CURED PRODUCT

TECHNICAL FIELD

The present invention relates to a novel photochromic curable composition, a cured product thereof and a laminate including the cured product. More specifically, it relates to a novel photochromic curable composition which provides a cured product having excellent photochromic properties without producing an appearance defect even under high-temperature and high-humidity conditions, a cured product thereof and a laminate including the cured product.

BACKGROUND ART

Photochromism is the reversible function of a certain compound that it changes its color swiftly upon exposure to light including ultraviolet light such as sunlight or light from a mercury lamp and returns to its original color when it is put in the dark by stopping its exposure to light and applied for various uses. As photochromic compounds having this property, fulgimide compounds, spirooxazine compounds, chromene compounds, etc. were discovered. Since optical articles having photochromic properties can be obtained by compounding these compounds with plastics, a large number of studies have been made on the compounding of these compounds.

For example, even in the field of spectacle lenses, photochromism is applied. Photochromic spectacle lenses comprising a photochromic compound function as sunglasses whose lenses are quickly colored outdoors where they are irradiated with light including ultraviolet light such as sunlight and as ordinary transparent eyeglasses whose lenses are faded indoors where there is no irradiation, and demand for the photochromic eyeglasses is growing nowadays.

As for photochromic spectacle lenses, plastic lenses are particularly preferred from the viewpoints of lightweight and safety, and photochromic properties are generally provided to the plastic lenses by compounding the above photochromic compounds. There are known a method in which a photochromic compound is dissolved in a monomer which is polymerized to obtain a photochromic lens directly (to be referred to as "kneading method" hereinafter) and a method in which a layer having photochromic properties (to be referred to as "photochromic layer" hereinafter) is formed on the surface of a plastic having no photochromic properties (to be referred to as "lamination method" hereinafter). Various proposals have been made for the techniques of the kneading method (WO01/005854, WO2009/075388, JP-A 2005-239887 and WO2013/002825A1) and the lamination method (WO01/005854, WO03/011967 and WO05/014717).

As for the photochromic compounds and plastic optical articles comprising these compounds and having photochromic properties, the following properties are required from the viewpoint of the photochromic function: (I) the degree of coloration at a visible light range before ultraviolet light is applied (to be referred to as "initial coloration" hereinafter) should be low, (II) the degree of coloration upon exposure to ultraviolet light (to be referred to as "color optical density" hereinafter) should be high, (III) the speed from the stoppage of the application of ultraviolet light to the time when the compound returns to its original state (to be referred to as "fading speed" hereinafter) should be high, (IV) the repeat durability of this reversible function should be high, (V) storage stability should be high, (VI) the compound should be easily molded into an optical article, and (VII) the mechanical strength of an optical article should be high.

With these technologies as a background, photochromic plastic lenses (optical materials) having high color optical density and high fading speed are proposed. The development of photochromic curable compositions comprising a combination of various polymerizable monomers and a photochromic compound (especially a chromene compound) in the kneading method and the lamination method is now under way.

Since the kneading method in particular makes it possible to mass-produce photochromic plastic lenses at a low cost by using a glass mold, it is now the main production method of the photochromic plastic lenses. Therefore, various improvements have been made on the method.

For example, the above four patent documents concerning the kneading method disclose photochromic curable compositions comprising specific (meth)acrylic polymerizable monomers and a chromene compound. By using these photochromic curable compositions, cured products having excellent mechanical strength and photochromic properties (photochromic plastic lenses) can be manufactured.

The above three patent documents concerning the lamination method disclose (1) a method in which a photochromic curable composition is applied to a plastic lens by spin coating to be cured optically (may also be referred to as "coating technique" hereinafter) and (2) a method in which a plastic lens is arranged with a space between it and a mold to fill a photochromic curable composition into the space and cure it (may be referred to as "two-stage polymerization technique" hereinafter). These three patent documents disclose photochromic curable compositions comprising specific (meth)acrylic polymerizable monomers and a chromene compound, which can be advantageously used in the coating technique and the two-stage polymerization technique. When these photochromic curable compositions are used, laminates having excellent photochromic properties (photochromic plastic lenses) can be manufactured by using the above lamination method.

However, due to growing demand for the improved performance of photochromic plastic lenses, a photochromic curable composition from which a higher-performance lens than before can be manufactured in both the kneading method and the lamination method has been desired.

Stated more specifically, a request for the use of a plastic photochromic lens under high-temperature and high-humidity conditions is increasing. According to studies conducted by the inventors of the present invention, it was found that, when photochromic cured products disclosed by WO01/005854 and WO2009/075388 are used repeatedly under high-temperature and high-humidity conditions, an appearance defect such as a crack may be produced. Further, it was revealed that a photochromic cured product disclosed by JP-A 2005-239887 can withstand repeated use under relatively high-temperature and high-humidity conditions but its fading speed is low and accordingly, its photochromic properties must be further improved.

That is, in the prior art, there is no photochromic cured product which highly satisfies the requirements for photochromic properties and properties under high-temperature and high-humidity conditions at the same time, and the development of a photochromic cured product which satisfies both of them has been desired.

Further, a request for the use of photochromic laminates disclosed by the above three patent documents concerning the lamination method under high-temperature and high-humidity conditions is increasing. According to studies conducted by the inventors of the present invention, it was found that, when the photochromic laminate of the prior art is used repeatedly under high-temperature and high-humidity conditions, an appearance defect such as a crack may be produced. Further, it was also found that a photochromic laminate which can withstand repeated use under relatively high-temperature and high-humidity conditions may not obtain sufficiently high surface hardness.

That is, in the prior art, there is no photochromic laminate which highly satisfies the requirements for properties under high-temperature and high-humidity conditions and mechanical properties (especially high surface hardness) while retaining high photochromic properties, and the development of a photochromic laminate which satisfies both of them has been desired.

DISCLOSURE OF THE INVENTION

Problem to be Solved by the Invention

It is therefore an object of the present invention to provide a photochromic curable composition capable of obtaining a photochromic cured product able to be used even under high-temperature and high-humidity conditions and having excellent photochromic properties and mechanical properties. It is another object of the present invention to provide a photochromic curable composition which has high moldability, especially moldability in the kneading method, and high dispersibility.

It is still another object of the present invention to provide a photochromic curable composition capable of forming a photochromic layer which has excellent photochromic properties and mechanical properties with high surface hardness, can be used even under high-temperature and high-humidity conditions, and has a good appearance with few defects such as cracks.

Other objects and advantages of the present invention will become apparent from the following description.

Means for Solving the Problem

The inventors of the present invention conducted intensive studies to solve the above problems. The inventors compared the monomer constitution of a cured product having excellent photochromic properties but poor properties under high-temperature and high-humidity conditions with the monomer constitution of a cured product having excellent properties under high-temperature and high-humidity conditions but poor photochromic properties. Then, they found that the obtained cured products differ in water absorption coefficient according to the monomer constitution in use with the result that there are differences in photochromic properties and properties under high-temperature and high-humidity conditions between them. Stated more specifically, since the cured product having excellent photochromic properties has a relatively high content of an ethylene oxide chain, it has a high water absorption coefficient and easily cracks under high-temperature and high-humidity conditions. On the other hand, since the cured product having excellent properties under high-temperature and high-humidity conditions has a relatively low content of the ethylene oxide chain, it has a low water absorption coefficient and rarely cracks even under high-temperature and high-humidity conditions but is inferior in photochromic properties.

When they investigated the relationship between the surface hardness and the occurrence frequency of cracking under high-temperature and high-humidity conditions of a photochromic laminate, they found that a photochromic laminate having a low content of the ethylene oxide chain in the photochromic layer has high surface hardness but easily cracks. Meanwhile, they found that a photochromic laminate having a high content of the ethylene oxide chain rarely cracks but has low surface hardness. Since the volume of the cured body in the photochromic laminate is smaller than that of a photochromic cured product obtained by the kneading method, it rarely cracks under relatively high-temperature and high-humidity conditions. Therefore, they found that the allowable range of the content of the ethylene oxide chain of the photochromic laminate is wider than that of the photochromic cured product obtained by the kneading method.

It is considered from this result that use under high-temperature and high-humidity conditions and the suppression of cracking while high surface hardness is retained might be made possible by enhancing the interaction among monomer constituent components contained in the photochromic layer.

When they investigated various monomer constitutions with which the photochromic properties, mechanical properties and properties under high-temperature and high-humidity conditions of the obtained cured product become excellent based on the above information, they found that the above problems can be solved by using a specific (meth)acrylate monomer having a polycarbonate group. The present invention was accomplished based on this finding.

That is, the first invention is a photochromic curable composition comprising (A) as a polymerizable (meth)acrylate component:

[A1] a polymerizable carbonate monomer represented by the following formula (1):

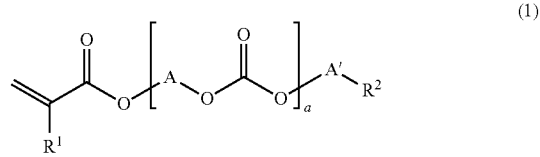

(wherein A and A' are each a linear or branched alkylene group having 2 to 15 carbon atoms, "a" is an average value of 1 to 20, when there are a plurality of A's, they may be the same or different, $R^1$ is a hydrogen atom or methyl group, and $R^2$ is a (meth)acryloyloxy group or hydroxyl group);

[A2] a polyfunctional polymerizable monomer represented by the following formula (2):

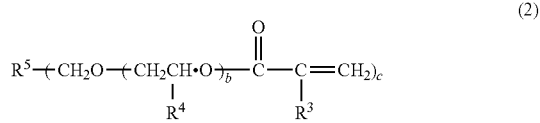

(wherein $R^3$ is a hydrogen atom or methyl group, $R^4$ is a hydrogen atom or alkyl group having 1 to 2 carbon atoms, $R^5$ is a trivalent to hexavalent organic group having 1 to 10 carbon atoms, "b" is an average value of 0 to 3, and "c" is an integer of 3 to 6); and

[A3] another polymerizable (meth)acrylate monomer different from the above components [A1] and [A2], and
(B) a photochromic compound (B).

Further, the second invention is a photochromic cured product obtained by curing the above photochromic curable composition.

The third invention is a photochromic laminate including a cured product obtained by curing the above photochromic curable composition on a plastic lens substrate.

Hereinafter, a photochromic cured product obtained by the kneading method may be simply referred to as "cured product". Further, a photochromic laminate having a layer composed of a cured product formed by curing the photochromic curable composition on a plastic lens substrate by the lamination method may be simply referred to as "laminate".

BEST MODE FOR CARRYING OUT THE INVENTION

The photochromic curable composition of the present invention comprises as (A) a polymerizable (meth)acrylate component: [A1] a carbonate-based polymerizable monomer represented by the above formula (1) (may also be simply referred to as "component [A1]" hereinafter), [A2] a polyfunctional polymerizable monomer represented by the above formula (2) (may also be simply referred to as "component [A2]" hereinafter), [A3] another polymerizable (meth)acrylate monomer different from the components [A1] and [A2] (may also be simply referred to as "component [A3]" hereinafter), and further (B) a photochromic compound (may also be simply referred to as "component (B)" hereinafter). A description is subsequently given of each of the above components.

(A) Polymerizable (Meth)Acrylate Component

The polymerizable (meth)acrylate component of the present invention contains the component [A1], the component [A2] and the component [A3] which are detailed hereinbelow. The polymerizable (meth)acrylate refers to a polymerizable monomer having a methacrylate group or an acrylate group.

Component [A1]: Carbonate-Based Polymerizable Monomer

A description is first given of the component [A1], that is, the polymerizable monomer having a polycarbonate group represented by the following formula (1). The component [A1] is represented by the following formula (1).

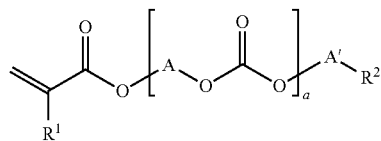

In the above formula, A and A' are each a linear or branched alkylene group having 2 to 15 carbon atoms, "a" is an average value of 1 to 20, when there are a plurality of A's, they may be the same or different, $R^1$ is a hydrogen atom or methyl group, and $R^2$ is a (meth)acryloyloxy group or hydroxyl group. In the above formula (1), A and A' are each a linear or branched alkylene group having 2 to 15 carbon atoms. It is a linear or branched alkylene group having preferably 3 to 9 carbon atoms, more preferably 4 to 7 carbon atoms from the viewpoints of the moldability of the photochromic curable composition, the photochromic properties (color optical density, fading speed) of the obtained cured product or laminate, and the surface hardness of the obtained photochromic laminate. Examples of the alkylene group include trimethylene group, tetramethylene group, pentamethylene group, hexamethylene group, octamethylene group, nonamethylene group, dodecamethylene group, pentadecamethylene group, 1-methyltriethylene group, 1-ethyltriethylene group and 1-isopropyltriethylene group.

In the above formula (1), "a" is an average value of 1 to 20. That is, the component [A1] may be composed of only molecules having bonds -A-O—(C=O)— with the same length (same molecular weight) or a mixture of monomers having bonds with different lengths (different in molecular weight). Since the component [A1] is generally obtained as a mixture of monomers having different molecular weights, "a" is given as an average value. The component [A1] is particularly preferably a mixture of carbonate-based polymerizable monomers represented by the following formula (5).

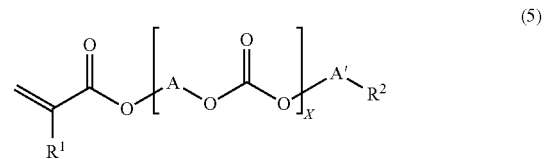

In the above formula, A, A', $R^1$ and $R^2$ are as defined in the above formula (1), and "x" is an integer of 1 to 30.

In the above formula (5), "x" is preferably an integer of 1 or more to 30 or less. The component [A1] may be a mixture of monomers which differ in "x" (different in molecular weight). In the case of a mixture, "a" (average value) in the formula (1) is obtained by dividing the total of "x"'s by the number of molecules. When the component [A1] is not a mixture (x is an integer of 1), "a" is equal to "x" as a matter of course.

As described above, preferably, "a" is an average value of 1 to 20 and, "x" is an integer of 1 to 30. From the viewpoints of moldability, photochromic properties (color optical density, fading speed) and surface hardness, more preferably, "a" is an average value of 2 to 8 and "x" is an integer of 2 to 15 and, much more preferably, "a" is an average value of 2 to 5 and "x" is an integer of 2 to 10.

As described above, there is a case where there are a plurality of A's. In this case, A's may be the same or different. From the viewpoint of compatibility with the other monomers, A's are preferably different from one another. When A's are different from one another, preferably, 10 to 90 mol % of an alkylene group having 3 to 5 carbon atoms and 10 to 90 mol % of an alkylene group having 6 to 9 carbon atoms are contained based on the total content of A's. Most preferably, 10 to 90 mol % of an alkylene group having 4 to 5 carbon atoms and 10 to 90 mol % of an alkylene group having 6 to 7 carbon atoms are contained based on the total content of A's. By using these A's, compatibility with the other polymerizable monomers is improved and a photochromic curable composition having high dispersibility can be obtained. As a result, a photochromic cured product or laminate whose cloudiness is suppressed can be obtained.

In the formula (1), $R^1$ is a hydrogen atom or methyl group, preferably a hydrogen atom from the viewpoint of photochromic properties (color optical density, fading speed).

In the formula (1), $R^2$ is a (meth)acryloyloxy group or hydroxyl group. The (meth)acryloyloxy group refers to a methacryloyloxy group or an acryloyloxy group.

The component [A1] may be a mixture of a monomer in which $R^2$ is a (meth)acryloyloxy group and a monomer in which $R^2$ is a hydroxyl group. When the proportion of a component in which $R^2$ is a hydroxyl group is larger than the proportion of a component in which $R^2$ is a (meth)acryloyloxy group, compatibility with the other polymerizable monomers may degrade, whereby the obtained photochromic cured product or laminate may be clouded and further the hardness or surface hardness of the photochromic cured product or laminate may deteriorate. Therefore, in the polymerizable monomer [A1] component, the molar ratio of the monomer component in which $R^2$ is a (meth)acryloyloxy group and the monomer component in which $R^2$ is a hydroxyl group is preferably 2:1 to 1:0. Most preferably, the component [A1] is only the monomer component in which $R^2$ is a (meth)acryloyloxy group.

A carbonate-based polymerizable monomer [A1a] of the above formula (5) in which $R^2$ is a (meth)acryloyloxy group is represented by the following formula (6).

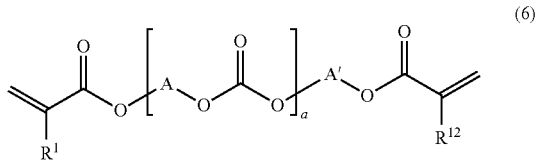

(6)

In the above formula, A, A', $R^1$ and "a" are as defined in the above formula (1), and $R^{12}$ is a hydrogen atom or methyl group.

A carbonate-based polymerizable monomer [A1b] in which $R^2$ is a hydroxyl group is represented by the following formula (7)

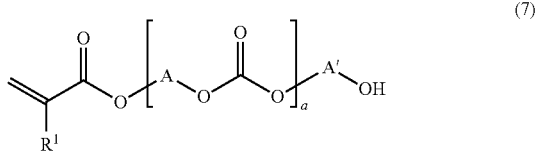

(7)

In the above formula, A, A', $R^1$ and "a" are as defined in the above formula (1).

By using the above-described component [A1], a photochromic cured product having excellent photochromic properties with high fading speed and a low water absorption coefficient can be manufactured. Further, a photochromic laminate having excellent photochromic properties with high fading speed and a low water absorption coefficient can be manufactured. Therefore, even when a photochromic curable composition is constituted by using a monomer containing an ethylene oxide chain in the molecular, the water absorption coefficient of the obtained photochromic cured product or laminate can be reduced, and the occurrence frequency of cracking of the cured product or laminate can be controlled. As a result, a photochromic cured product or laminate having excellent photochromic properties and excellent properties under high-temperature and high-humidity conditions can be obtained.

Production Method of Component [A1]

The component [A1] can be produced by reacting a polycarbonate diol with (meth)acrylic acid. Examples of the polycarbonate diol as a raw material include a polycarbonate diol obtained by phosgenating trimethylene glycol (number average molecular weight of 500 to 2,000), polycarbonate diol obtained by phosgenating tetramethylene glycol (number average molecular weight of 500 to 2,000), polycarbonate diol obtained by phosgenating pentamethylene glycol (number average molecular weight of 500 to 2,000), polycarbonate diol obtained by phosgenating hexamethylene glycol (number average molecular weight of 500 to 2,000), polycarbonate diol obtained by phosgenating octamethylene glycol (number average molecular weight of 500 to 2,000), polycarbonate diol obtained by phosgenating nonamethylene glycol (number average molecular weight of 500 to 2,000), polycarbonate diol obtained by phosgenating triethylene glycol and tetramethylene glycol (number average molecular weight of 500 to 2,000), polycarbonate diol obtained by phosgenating tetramethylene glycol and hexamethylene glycol (number average molecular weight of 500 to 2,000), polycarbonate diol obtained by phosgenating pentamethylene glycol and hexamethylene glycol (number average molecular weight of 500 to 2,000), polycarbonate diol obtained by phosgenating tetramethylene glycol and octamethylene glycol (number average molecular weight of 500 to 2,000), polycarbonate diol obtained by phosgenating hexamethylene glycol and octamethylene glycol (number average molecular weight of 500 to 2,000), and polycarbonate diol obtained by phosgenating 1-methyl trimethylene glycol (number average molecular weight of 500 to 2,000). The polycarbonate diol used as the raw material preferably has a number average molecular weight of 500 to 2,000 as described above.

As the production method of the component [A1], the following method may be employed. 2 to 4 moles of (meth)acrylic acid and 0.01 to 0.20 mole of an acid as a catalyst based on 1 mole of the polycarbonate diol and 1 to 5 g of an organic solvent and 0.0001 to 0.01 g of a polymerization inhibitor based on 1 g of the polycarbonate diol are mixed together and reacted at a reflux temperature. The above amounts of the components are based on 1 mole of the polycarbonate diol or 1 g of the polycarbonate.

As the organic solvent, toluene, benzene and chloroform all of which are azeotropic with water may be used, out of which benzene is most preferred. As the acid, paratoluenesulfonic acid and sulfuric acid may be used, out of which paratoluenesulfonic acid is preferred. As the polymerization inhibitor, p-methoxyphenol and BHT (dibutyl hydroxytoluene) may be used.

In the above reaction, water is produced in the reaction system. Therefore, the reaction is carried out while water is removed. The mixing ratio of the component [A1a] to the component [A1b] can be determined by the amount of removed water. That is, when the same number of moles (100 mol %) as that of the polycarbonate diol in use of water is removed, the component [A1b] is produced. When the number of moles of removed water is twice (200 mol %) as much as that of the polycarbonate diol, the component [A1a] is produced. When the amount of removed water is between 100 and 200 mol %, a mixture of the components [A1a] and [A1b] can be obtained. Stated more specifically, when the amount of removed water is 1.7 moles (170 mol %) based on 1 mole of the polycarbonate diol in use, a mixture of the components [A1a] and [A1b] in a molar ratio of 7:3 (component [A1a]:component [A1b]=7:3) can be produced. When an unreacted polycarbonate diol is existent, it should be removed by purification.

Component [A2]

A description is subsequently given of the component [A2], that is, the polyfunctional polymerizable monomer represented by the following formula (2). By using this component [A2], photochromic properties and the hardness or surface hardness of the photochromic cured product or laminate can be improved.

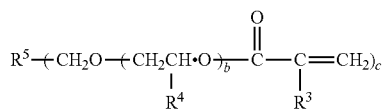

(2)

In the above formula, $R^3$ is a hydrogen atom or methyl group, $R^4$ is a hydrogen atom or alkyl group having 1 to 2 carbon atoms, $R^5$ is a trivalent to hexavalent organic group having 1 to 10 carbon atoms, "b" is an average value of 0 to 3, and "c" is a number of 3 to 6.

In the above formula (2), $R^5$ is a trivalent to hexavalent organic group having 1 to 10 carbon atoms, as exemplified by trivalent to hexavalent hydrocarbon groups having 1 to 10 carbon atoms, trivalent to hexavalent groups having 1 to 10 carbon atoms and containing an oxygen atom in the chain, and trivalent to hexavalent organic groups containing an urethane bond. $R^4$ is preferably a methyl group.

Preferred examples of the component [A2] include trimethylolpropane trimethacrylate, trimethylolpropane triacrylate, tetramethylolmethane trimethacrylate, tetramethylolmethane triacrylate, tetramethylolmethane tetramethacrylate, tetramethylolmethane tetraacrylate, trimethylolpropane triethylene glycol trimethacrylate, trimethylolpropane triethylene glycol triacrylate, ditrimethylolpropane tetramethacrylate and ditrimethylolpropane tetraacrylate. These polyfunctional polymerizable monomers may be used in combination of two or more.

These polyfunctional polymerizable monomers are preferably such that $R^5$ is a trivalent hydrocarbon group from the viewpoint of photochromic properties, especially fading speed, particularly preferably trimethylolpropane trimethacrylate or ditrimethylolpropane tetramethacrylate from the viewpoint of the effect.

Component [A3]

A description is subsequently given of the component [A3], that is, another polymerizable (meth)acrylic monomer different from the components [A1] and [A2]. The refractive index can be changed according to the monomer selected as the component [A3] in the present invention. By selecting the type of the component [A3] and adjusting the blending ratio of the component [A3], a photochromic curable composition which is most suitable for the kneading method and the lamination method can be prepared. In the kneading method, the refractive index of the obtained photochromic cured product can be adjusted by changing the type of the component [A3]. Further, in the lamination method, a laminate which can be used under high-temperature and high-humidity conditions and exhibits excellent photochromic properties can be obtained by adjusting the blending ratio of the monomer having a long ethylene oxide•propylene oxide chain. A description is subsequently given of the component [A3].

Component [A3a]

To obtain a photochromic cured product having a low refractive index of 1.49 to 1.51, a bifunctional (meth)acrylate monomer represented by the following formula (3) [A3a] is used.

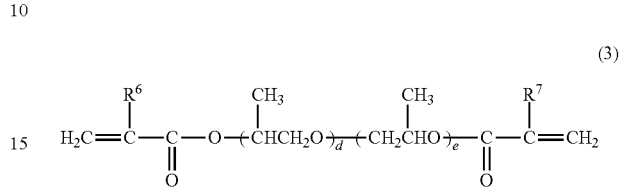

(3)

In the above formula, $R^6$ and $R^7$ are each a hydrogen atom or methyl group, "d" and "e" are each an integer of 0 or more, with the proviso that when both $R^6$ and $R^7$ are methyl groups, (d+e) is an average value of 2 or more to less than 7, when $R^6$ is a methyl group and $R^7$ is a hydrogen atom, (d+e) is an average value of 2 or more to less than 5, and when both $R^6$ and $R^7$ are hydrogen atoms, (d+e) is an average value of 2 or more to less than 3. The bifunctional (meth)acrylate monomer represented by the above formula (3) (component [A3a]) is generally obtained as a mixture of molecules which differ in molecular weight. Therefore, "d" and "e" are given as average values.

As the component [A3a], for example, a di(meth)acrylate monomer such as tripropylene glycol dimethacrylate and tetrapropylene glycol dimethacrylate is preferably used. When the component [A3a] is used, the numbers of carbon atoms and hydrogen atoms become large in the structure of the cured product with the result that the cured product may become brittle. Therefore, a polyfunctional urethane(meth)acrylate which is detailed hereinbelow is preferably used to improve the strength of the cured product.

Component [A3b]

To obtain a photochromic cured product having an intermediate refractive index of 1.52 to 1.57, as another most suitable combination, a bifunctional (meth)acrylate monomer represented by the following formula (4) [A3b] is preferably used as the component [A3].

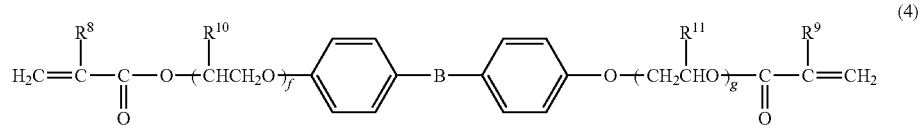

(4)

In the above formula, $R^8$ and $R^9$ are each a hydrogen atom or methyl group, $R^{10}$ and $R^{11}$ are each a hydrogen atom or methyl group, B is any one of the following groups, and "f" and "g" are each an integer of 1 or more, with the proviso that when both $R^8$ and $R^9$ are methyl groups, (f+g) is an average value of 2 or more to less than 7, when $R^8$ is a methyl group and $R^9$ is a hydrogen atom, (f+g) is an average value of 2 or more to less than 5, and when both $R^8$ and $R^9$ are hydrogen atoms, (f+g) is an average value of 2 or more to less than 3.

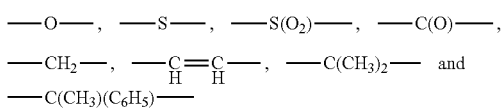

The bifunctional (meth)acrylate monomer represented by the above formula (4) (component [A3b]) is generally obtained as a mixture of molecules which differ in molecular weight. Therefore, "f" and "g" are given as average values.

Examples of the component [A3b] include bisphenol A dimethacrylate, 2,2-bis(4-methacryloyloxyethoxyphenyl) propane, 2,2-bis(3,5-dibromo-4-methacryloyloxyethoxyphenyl) propane, 2,2-bis(4-methacryloyloxydipropoxyphenyl)propane and bisphenol A diacrylate. 2,2-bis(4-methacryloyloxyethoxyphenyl)propane is preferably used from the viewpoints of mechanical strength and moldability.

Component [A3c]

To obtain a photochromic laminate in particular, as still another most suitable combination, the component [A3] preferably contains a bifunctional polymerizable monomer represented by the following formula (14).

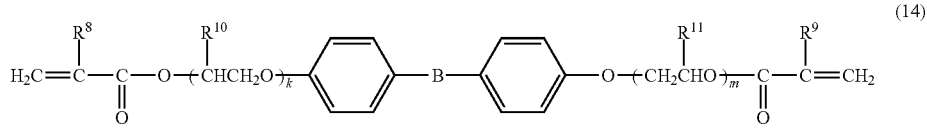

In the above formula, $R^8$, $R^9$, $R^{10}$, $R^{11}$ and B are as defined in the above formula (4), and "k" and "m" are each an integer of 1 or more, with the proviso that when both $R^8$ and $R^9$ are methyl groups, (k+m) is an average value of 7 to 30, when $R^8$ is a methyl group and $R^9$ is a hydrogen atom, (k+m) is an average value of 7 to 25, and when both $R^8$ and $R^9$ are hydrogen atoms, (k+m) is an average value of 7 to 20.

The bifunctional (meth)acrylate monomer represented by the above formula (14) (component [A3c]) is generally obtained as a mixture of molecules which differ in molecular weight. Therefore, "k" and "m" are given as average values.

The bifunctional (meth)acrylate monomer represented by the formula (14) has a longer ethylene oxide chain or propylene oxide chain than that of the bifunctional (meth) acrylate monomer represented by the formula (4). Therefore, this component [A3c] can be advantageously used in a blending ratio which is detailed hereinafter in order to produce a laminate which can reduce the volume of the obtained cured product.

Examples of the component [A3c] include 2,2-bis[4-methacryloxy(polyethoxy)phenyl]propane (k+m=10), 2,2-bis[4-methacryloxy(polyethoxy)phenyl]propane (k+m=17), 2,2-bis[4-methacryloxy(polyethoxy)phenyl]propane (k+m=30), 2,2-bis[4-acryloxy(polyethoxy)phenyl]propane (k+m=10) and 2,2-bis[4-acryloxy(polyethoxy)phenyl]propane (k+m=20). 2,2-bis[4-methacryloxy(polyethoxy)phenyl]propane (k+m=10) may be particularly preferably used in the lamination method from the viewpoints of mechanical strength, photochromic properties and surface hardness.

Another Component [A3]

A (meth)acrylic polymerizable monomer except for the components [A1] and [A2] may be used without restriction. Examples of the other component [A3] include unsaturated carboxylic acids such as methoxy polyethylene glycol methacrylate having an average molecular weight of 293, methoxy polyethylene glycol methacrylate having an average molecular weight of 468, methoxy polyethylene glycol acrylate having an average molecular weight of 218, methoxy polyethylene glycol acrylate having an average molecular weight of 454, 2-hydroxy methacrylate, 2-hydroxy acrylate, diethylene glycol dimethacrylate, triethylene glycol dimethacrylate, tetraethylene glycol dimethacrylate, pentaethylene glycol dimethacrylate, pentapropylene glycol dimethacrylate, diethylene glycol diacrylate, triethylene glycol diacrylate, tetraethylene glycol diacrylate, pentaethylene glycol diacrylate, tripropylene glycol diacrylate, tetrapropylene glycol diacrylate, pentapropylene glycol diacrylate, dimethacrylate composed of a mixture of polypropylene glycol and polyethylene glycol (polyethylene has 2 recurring units and polypropylene has 2 recurring units), polyethylene glycol dimethacrylate having an average molecular weight of 330, polyethylene glycol dimethacrylate having an average molecular weight of 536, polytetramethylene glycol dimethacrylate having an average molecular weight of 736, tripropylene glycol dimethacrylate, tetrapropylene glycol dimethacrylate, polypropylene glycol dimethacrylate having an average molecular weight of 536, polyethylene glycol diacrylate having an average molecular weight of 258, polyethylene glycol diacrylate having an average molecular weight of 308, polyethylene glycol diacrylate having an average molecular weight of 508, polyethylene glycol diacrylate having an average molecular weight of 708, polyethylene glycol methacrylate acrylate having an average molecular weight of 536, polyethylene and polypropylene glycol diacrylates having an average molecular weight of 330, ethoxylated cyclohexanedimethanol acrylate having an average molecular weight of 434, 2,2-bis[4-methacryloxy•ethoxy]phenyl]propane having an average molecular weight of 452, 2,2-bis[4-methacryloxy•diethoxy] phenyl]propane having an average molecular weight of 478, 2,2-bis[4-acryloxy•polyethoxy]phenyl]propane having an average molecular weight of 466, polyester oligomer hexaacrylate, caprolactone modified dipentaerythritol hexaacrylate, tetrafunctional polyester oligomers having a molecular weight of 2,500 to 3,500 (such as EB80 of Daicel-UCB Co., Ltd. (having four (meth)acrylic groups in one molecule)), tetrafunctional polyester oligomers having a molecular weight of 6,000 to 8,000 (such as EB450 of Daicel-UCB Co., Ltd. (having 4 (meth)acrylic groups in one molecule)), hexafunctional polyester oligomers having a molecular weight of 45,000 to 55,000 (such as EB1830 of Daicel-UCB Co., Ltd. (having 6 (meth)acrylic groups in one molecule)), tetrafunctional polyester oligomers having a molecular weight of 10,000 (such as GX8488B of Daiichi Kogyou Seiyaku Co., Ltd. (having 6 (meth)acrylic groups in one molecule)), ethylene glycol bisglycidyl methacrylate, 1,4-butylene glycol dimethacrylate, 1,9-nonylene glycol dimethacrylate, neopentylene glycol dimethacrylate, bis(2-methacryloyloxyethylthioethyl)sulfide, bis(methacryloyloxyethyl)sulfide, bis(acryloyloxyethyl)sulfide, 1,2-bis (methacryloyloxyethylthio)ethane, 1,2-bis (acryloyloxyethyl)ethane, bis(2-methacryloyloxyethylthioethyl)sulfide, bis(2-acryloyloxyethylthioethyl) sulfide, 1,2-bis(methacryloyloxyethylthioethylthio)ethane, 1,2-bis(acryloyloxyethylthioethylthio)ethane, 1,2-bis(methacryloyloxyisopropylthioisopropyl)sulfide, 1,2-bis(acryloyloxyisopropylthioisopropyl)sulfide, stearyl methacrylate, lauryl methacrylate, methyl acrylate, ethyl acrylate, butyl acrylate, octyl acrylate, lauryl acrylate, acrylic acid, methacrylic acid and maleic anhydride; ester compounds of acrylic acid or methacrylic acid such as methyl methacrylate, benzyl methacrylate, phenyl methacrylate and 2-hydroxyethyl methacrylate; ester compounds of thioacrylic acid or thiomethacrylic acid such as methylthio acrylate, benzylthio acrylate and benzylthio methacrylate; and polyfunctional urethane(meth)acrylates such as urethane di(meth)acrylate, silsesquioxane monomers having a (meth)acrylic group and cage-like, ladder-like and random structures, 2-isocyanatoethyl methacrylate, γ-methacryloxypropyl trimethoxysilane and γ-methacryloxypropylmethyl dimethoxysilane.

Preferably, the above polyfunctional urethane(meth)acrylates have no aromatic ring in the molecular structure and are not yellowed from the viewpoint of the light resistance of a cured resin. More specifically, the polyfunctional urethane (meth)acrylates include urethane(meth)acrylate monomers which are reaction mixtures obtained by reacting hexamethylene diisocyanate, isophorone diisocyanate, lysine isocyanate, 2,2,4-hexamethylene diisocyanate, dimeric acid isocyanate, isopropylidenebis-4-cyclohexyl isocyanate, dicyclohexylmethane diisocyanate, norbornene diisocyanate or methylcyclohexane diisocyanate with a polyalkylene glycol having a recurring unit of ethylene oxide or propylene oxide having 2 to 4 carbon atoms or a recurring unit of hexamethylene oxide, polyester diol such as polycaprolactone diol, polyfunctional polyol such as polycarbonate diol or polybutadiene diol, or diol such as pentaerythritol, ethylene glycol, propylene glycol, 1,3-propanediol, 1,4-butanediol, 1,5-pentanediol, 1,6-hexanediol, 1,9-nonanediol, 1,8-nonanediol, neopentyl glycol, diethylene glycol, dipropylene glycol, 1,4-cyclohexanediol, 1,4-cyclohexanedimethanol, glycerin, trimethylolpropane and pentaerythritol to obtain an urethane prepolymer and further reacting the prepolymer with 2-hydroxy(meth)acrylate, or reaction mixtures obtained by directly reacting the above diisocyanate with 2-hydroxy(meth)acrylate. The number of functional groups of each of the (meth)acrylates is preferably 2 to 15. When the number of functional groups is large, the obtained photochromic cured product may become brittle. Therefore, an urethane di(meth)acrylate monomer having two functional groups is preferred. When the urethane(meth)acrylate monomer is bifunctional, the (meth) acrylic equivalent is particularly preferably 200 or more to less than 600 as the effect of improving mechanical properties is large. Examples of the urethane(meth)acrylate monomer include polyfunctional urethane(meth)acrylate monomers such as U-4HA (molecular weight of 596, 4 functional groups), U-6HA (molecular weight of 1,019, 6 functional groups), U-6LPA (molecular weight of 818, 6 functional groups) and U-15HA (molecular weight of 2,300, 15 functional groups), bifunctional urethane(meth)acrylate monomers such as U-2PPA (molecular weight of 482), UA-122P (molecular weight of 1,100) and U-122P (molecular weight of 1,100) (all of these are manufactured by Shin-Nakamura Chemical Co., Ltd.), EB4858 (molecular weight of 454) (manufactured by Daicel-UCB Co., Ltd.), and urethane(meth)acrylate monomers having a (meth) acrylic equivalent of 600 or more such as U-108A, U-200PA, UA-511, U-412A, UA-4100, UA-4200, UA-4400, UA-2235PE, UA-160TM, UA-6100, UA-6200, U-108, UA-4000 and UA-512 of Shin-Nakamura Chemical Co., Ltd., and UX-2201, UX-3204, UX4101, 6101, 7101 and 8101 of Nippon Kayaku Co., Ltd.

Besides the above compounds, a polymerizable monomer having an epoxy group and represented by the following formula (11) may also be used.

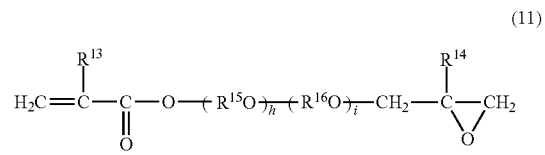

(11)

In the above formula, $R^{13}$ and $R^{14}$ are each a hydrogen atom or methyl group, $R^{15}$ and $R^{16}$ are each an alkylene group having 1 to 4 carbon atoms which may be substituted by a hydroxyl group or group represented by the following formula (12), and "h" and "i" are each an average value of 0 to 20.

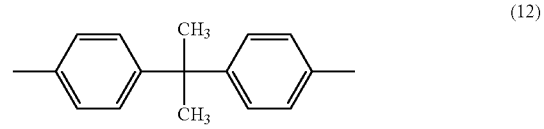

(12)

When the polymerizable monomer having an epoxy group and represented by the above formula (11) (epoxy group-containing polymerizable monomer) is contained, excellent photochromic properties can be obtained for a long time.

Examples of the alkylene group represented by $R^{15}$ and $R^{16}$ include methylene group, ethylene group, propylene group, butylene group, trimethylene group and tetramethylene group. The compound represented by the above formula (11) may be obtained as a mixture of molecules which differ in molecular weight. Therefore, "h" and "i" are given as average values.

Examples of the compound represented by the above formula (11) include glycidyl methacrylate, glycidyloxymethyl methacrylate, 2-glycidyloxyethyl methacrylate, 3-glycidyloxypropyl methacrylate, 4-glycidyloxybutyl methacrylate, polyethylene glycol glycidyl methacrylate having an average molecular weight of 406, polyethylene glycol glycidyl methacrylate having an average molecular weight of 538, polyethylene glycol glycidyl methacrylate having an average molecular weight of 1,022, polypropylene glycol glycidyl methacrylate having an average molecular weight of 664, bisphenol A-monoglycidyl ether-methacrylate, 3-(glycidyl-2-oxyethoxy)-2-hydroxypropyl methacrylate, glycidyl acrylate, glycidyloxymethyl acrylate, 2-glycidyloxyethyl acrylate, 3-glycidyloxypropyl acrylate, 4-glycidyloxybutyl acrylate, polyethylene glycol glycidyl acrylate having an average molecular weight of 406, polyethylene glycol glycidyl acrylate having an average molecular weight of 538, polyethylene glycol glycidyl acrylate having an average molecular weight of 1,022, 3-(glycidyloxy-1-isopropyloxy)-2-hydroxypropyl acrylate and 3-(glycidyloxy-2-hydroxypropyloxy)-2-hydroxypropyl acrylate. Out of these, glycidyl methacrylate, glycidyloxymethyl methacrylate, 2-glycidyloxyethyl methacrylate, 3-glycidyloxypropyl methacrylate and glycidyl acrylate are preferred, and glycidyl methacrylate is particularly preferred.

The silsesquioxane monomers include, for example, a monomer represented by the following formula (13).

$(R^{17}-SiO_{3/2})_j$ (13)

In the above formula, a plurality of $R^{17}$'s may be the same or different, at least three $R^{17}$'s are organic groups containing a radically polymerizable group, the other $R^{17}$'s except for the organic group containing a radically polymerizable group are each a hydrogen atom, alkyl group, cycloalkyl group, alkoxy group or phenyl group, and "j" is an integer of 6 to 100 which indicates the degree of polymerization.

The organic group containing a radically polymerizable group of $R^{17}$ includes an organic group composed of only a polymerizable group (includes an organic group having a polymerizable group (such as a (meth)acrylic group) bonded directly to a silicon atom). Examples of the organic group include organic groups having a (meth)acrylic group such as (meth)acrylic group, (meth)acryloxypropyl group and (3-(meth)acryloxypropyl)dimethylsiloxy group; organic groups having an allyl group such as allyl group, allylpropyl group and allylpropyldimethylsiloxy group; organic groups having a vinyl group such as vinyl group, vinylpropyl group and vinyldimethylsiloxy group; organic groups having a cyclohexenyl group such as (4-cyclohexenyl)ethyldimethylsiloxy group; organic groups having a norbornenyl group such as norbornenylethyl group and norbornenylethyldimethylsiloxy group; and organic groups having a maleimide group such as N-maleimidepropyl group. Out of these, organic groups having a (meth)acrylic group are particularly preferred as they have high film strength while exhibiting excellent photochromic properties.

The alkyl group of $R^{17}$ is preferably an alkyl group having 1 to 10 carbon atoms. Examples of the alkyl group having 1 to 10 carbon atoms include methyl group, ethyl group, n-propyl group, isopropyl group, n-butyl group, sec-butyl group, tert-butyl group, n-pentyl group, n-hexyl group, n-octyl group and isooctyl group.

The cycloalkyl group is preferably a cycloalkyl group having 3 to 8 carbon atoms. Examples of the cycloalkyl group having 3 to 8 carbon atoms include cyclopropyl group, cyclobutyl group, cyclooctyl group, cyclohexyl group, cycloheptyl group and cyclooctyl group.

The alkoxy group is preferably an alkoxy group having 1 to 6 carbon atoms. Examples of the alkoxy group having 1 to 6 carbon atoms include methoxy group, ethoxy group, n-propoxy group, isopropoxy group, n-butoxy group, sec-butoxy group and tert-butoxy group.

Although the silsesquioxane compound may take various structures such as cage-like, ladder-like and random structures, it is preferably a mixture having a plurality of structures in the present invention.

The above components [A3] may be used alone or in combination.

Blending Ratio of Components in Component (A) (Polymerizable (Meth)Acrylic Monomers)

The polymerizable (meth)acrylate component (A) (component (A)) used in the present invention contains the components [A1], [A2] and [A3].

The blending ratio of these components may be suitably determined according to use purpose. When the amount of the component (A) is 100 mass % (the total content of the components [A1], [A2] and [A3] is 100 mass %), the component (A) preferably contains 5 to 50 mass % of the component [A1], 1 to 70 mass % of the component [A2] and 1 to 94 mass % of the component [A3]. Since the photochromic curable composition of the present invention comprises 5 to 50 mass % of the component [A1], it is excellent in properties under high-temperature and high-humidity conditions. Since the kneading method and the lamination method differ from each other in the optimum contents and types of the optimal monomers in use, each of them is described hereinbelow.

(Blending Ratio of Components in Component (A) Preferred for Kneading Method)

When the kneading method is used in the present invention, 5 to 50 mass % of the component [A1], 1 to 30 mass % of the component [A2] and 20 to 94 mass % of the component [A3] are preferably contained. The total content of the components [A1], [A2] and [A3] is 100 mass %.

The content of the component [A1] is more preferably 10 to 30 mass % based on 100 mass % of the component (A) in order to reduce the water absorption coefficient and ensure the hardness of the obtained photochromic cured product. Further, the content of the component [A2] is more preferably 5 to 20 mass %, much more preferably 7 to 15 mass % based on 100 mass % of the component (A) from the viewpoints of the fading speed and mechanical strength of the obtained photochromic cured product. The content of the component [A3] is determined to ensure that the total content of the components [A1], [A2] and [A3] becomes 100 mass %.

In the present invention, when the contents of the components [A1] and [A2] satisfy the above ranges, the obtained photochromic cured product produces an excellent effect. Even when the refractive index of the obtained photochromic cured product is adjusted by the component [A3], it is possible to store and use the photochromic cured product under high-temperature and high-humidity conditions, and a photochromic cured product having excellent photochromic properties can be obtained. In the kneading method, a photochromic curable composition which forms a cured product having a refractive index of 1.49 to 1.51 and a photochromic curable composition which forms a cured product having a refractive index of 1.52 to 1.57 differ from each other in the optimum blending ratios and types of the monomers. A description is subsequently given of the photochromic curable composition which forms a cured product having a refractive index of 1.49 to 1.51.

(Kneading Method: Photochromic Cured Product Having a Low Refractive Index (1.49 to 1.51))

To obtain a photochromic cured product having a refractive index of 1.49 to 1.51 from the photochromic curable composition of the present invention by the kneading method, the composition preferably comprises 20 to 100 mass % of the bifunctional (meth)acrylate monomer represented by the above formula (3) (component [A3a]) based on 100 mass % of the total of the component [A3]. Specific examples of the component [A3a] include tripropylene glycol dimethacrylate and tetrapropylene glycol dimethacrylate.

When a photochromic cured product having a refractive index of 1.49 to 1.51 is to be obtained and the component [A3] contains another component [A3] different from the component [A3a], the following component is preferably contained as the other component [A3]. Stated more specifically, an epoxy group-containing (meth)acrylate monomer represented by the above formula (11), a polyfunctional urethane(meth)acrylate monomer, a di(meth)acrylate monomer having 3 or more to less than 10 ethylene glycol chains as recurring units and a monofunctional (meth)acrylate monomer are preferably contained.

The polyfunctional urethane(meth)acrylate monomer is preferably a polyfunctional urethane(meth)acrylate having a (meth)acrylic equivalent of 100 or more to less than 600.

Preferred examples of the di(meth)acrylate monomer having 3 or more to less than 10 ethylene glycol chains as recurring units include triethylene glycol dimethacrylate, polyethylene glycol diacrylate having an average molecular weight of 330 (tetraethylene glycol dimethacrylate), polyethylene glycol dimethacrylate having an average molecular weight of 536 (9 recurring units), polyethylene glycol diacrylate having an average molecular weight of 308 (tetraethylene glycol diacrylate) and polyethylene glycol diacrylate having an average molecular weight of 508 (9 recurring units).

Preferred examples of the monofunctional (meth)acrylate monomer include methoxy polyethylene glycol methacrylate having an average molecular weight of 293, methoxy polyethylene glycol methacrylate having an average molecular weight of 468, methoxy polyethylene glycol acrylate having an average molecular weight of 218 and methoxy polyethylene glycol acrylate having an average molecular weight of 454.

As for the blending ratios of these components, preferably, the content of the bifunctional (meth)acrylate monomer represented by the above formula (3) (component [A3a]) is 20 to 95 mass %, the content of the epoxy group-containing (meth)acrylate monomer represented by the above formula (11) is 1 to 5 mass %, the content of the polyfunctional urethane(meth)acrylate monomer is 4 to 40 mass %, the content of the di(meth)acrylate monomer having 3 or more to less than 10 ethylene glycol chains as recurring units is 0 to 20 mass %, and the content of the monofunctional (meth)acrylate monomer is 0 to 15 mass % based on 100 mass % of the total of the components [A3]. Further, more preferably, the content of the bifunctional (meth)acrylate monomer represented by the above formula (3) ([A3a]) is 46 to 78 mass %, the content of the epoxy group-containing (meth)acrylate monomer represented by the above formula (11) is 1 to 4 mass %, the content of the polyfunctional urethane(meth)acrylate monomer is 20 to 40 mass %, and the content of the monofunctional (meth) acrylate monomer is 1 to 10 mass %.

A description is subsequently given of a photochromic curable composition which forms a cured product having a refractive index of 1.52 to 1.57.

(Kneading Method: Photochromic Cured Product Having a High Refractive Index (1.52 to 1.57))

To obtain a photochromic cured product having a refractive index of 1.52 to 1.57 from the photochromic curable composition of the present invention by the kneading method, the composition preferably comprises 20 to 100 mass % of the bifunctional (meth)acrylate monomer represented by the above formula (4) ([A3b]) based on 100 mass % of the total of the components [A3]. Out of the di(meth) acrylate monomers represented by the above formula (4), 2,2-bis(4-methacryloyloxyethoxyphenyl)propane in which the average value of (f+g) is 2.6 is particularly preferred.

When a photochromic cured product having a refractive index of 1.51 to 1.57 is to be obtained and the component [A3] contains another component [A3] different from the component [A3b], the following component is preferably contained as the other component [A3]. Stated more specifically, an epoxy group-containing (meth)acrylate monomer represented by the above formula (11), a bifunctional (meth)acrylate monomer having a benzene ring and a di(meth)acrylate monomer having 3 or more to less than 10 ethylene glycol chains as recurring units are preferably contained.

Preferred examples of the bifunctional (meth)acrylate monomer having a benzene ring include 2,2-bis[4-methacryloxy•polyethoxy]phenyl]propane having an average molecular weight of 804, 2,2-bis[4-acryloxy•diethoxy] phenyl]propane having an average molecular weight of 512, and 2,2-bis[4-acryloxy•polyethoxy]phenyl]propane having an average molecular weight of 776.

Preferred examples of the di(meth)acrylate monomer having 3 or more to less than 10 ethylene glycol chains as recurring units include triethylene glycol dimethacrylate, polyethylene glycol diacrylate having an average molecular weight of 330 (tetraethylene glycol dimethacrylate), polyethylene glycol dimethacrylate having an average molecular weight of 536 (9 recurring units), polyethylene glycol diacrylate having an average molecular weight of 308 (tetraethylene glycol diacrylate), and polyethylene glycol diacrylate having an average molecular weight of 508 (9 recurring units).

Preferably, the content of the bifunctional (meth)acrylate monomer represented by the above formula (4) ([A3b]) is 20 to 98 mass %, the content of the epoxy group-containing (meth)acrylate monomer represented by the above formula (11) is 1 to 5 mass %, the content of the bifunctional (meth)acrylate monomer having a benzene ring is 1 to 10 mass %, the content of the di(meth)acrylate monomer having 3 or more to less than 10 ethylene glycol chains as recurring units is 0 to 55 mass %, and the content of the monofunctional (meth)) acrylate monomer is 0 to 10 mass % based on 100 mass % of the total of the components [A3]. Further, more preferably, the content of the bifunctional (meth)acrylate monomer represented by the above formula (4) ([A3b]) is 31 to 96 mass %, the content of the epoxy group-containing (meth)acrylate monomer represented by the above formula (11) is 1 to 5 mass %, the content of the bifunctional (meth)acrylate monomer having a benzene ring is 1 to 5 mass %, the content of the di(meth)acrylate monomer having 3 or more to less than 10 ethylene glycol chains as recurring units is 1 to 50 mass %, and the content of the monofunctional (meth)acrylate monomer is 1 to 9 mass %.

The kneading method has been described above, and the above blending ratios and types of the monomers are just examples preferred for the kneading method and may also be applied to the lamination method as a matter of course.

A description is subsequently given of a photochromic curable composition which is preferred for the lamination method.

(Blending Ratio of Components in Component (A) Preferred for Lamination Method)

The blending ratio of components used in the lamination method may be suitably determined according to use purpose. Preferably, the content of the component [A1] is 5 to 50 mass %, the content of the component [A2] is more than 30 mass % to 70 mass % or less, and the content of the component [A3] is 1 mass % or more to less than 65 mass % based on 100 mass % of the above component (A).

In the present invention, the content of the component [A1] used in the lamination method is preferably 5 to 50 mass %, more preferably 5 to 45 mass %, most preferably 10 to 30 mass % based on 100 mass % of the component (A) from the viewpoint of the photochromic properties of the obtained photochromic laminate and the improvement of surface hardness while cracking under high-temperature and high-humidity conditions is suppressed. When the content of the component [A1] is too low and surface hardness is made high, it may be difficult to suppress the occurrence frequency of cracking. When the content of the component [A1] is too high, surface hardness and color optical density which is one of the photochromic properties tend to deteriorate.

The content of the component [A2] used in the lamination method is preferably more than 30 mass % to 70 mass % or less, more preferably more than 30 mass % to 60 mass % or less, much more preferably 35 to 50 mass % based on 100 mass % of the component (A) from the viewpoints of the fading speed, color optical density and surface hardness of the obtained photochromic laminate and the suppression of cracking under high-temperature and high-humidity conditions. When the content of the component [A2] is too low, surface hardness tends to degrade. When the content of the component [A2] is too high, cracking tends to occur under high-temperature and high-humidity conditions. Within the above blending ratio, the mass ratio of the component [A1] to the component [A2] ([A1]/[A2]) is preferably 0.2 to 2.0 to obtain high physical properties.

The component [A3] is blended to ensure that the total content of the components [A1], [A2] and [A3] becomes 100 mass %. Stated more specifically, the content of the component [A3] is preferably 1 mass % or more to less than 65 mass %, more preferably 10 mass % or more to less than 65 mass %, much more preferably 20 to 50 mass %. When the blending ratio of the components [A1], [A2] and [A3] satisfies the above value, the obtained photochromic laminate produces an excellent effect.

To obtain a photochromic laminate having excellent physical properties, a combination of the following monomers is preferred as the component [A3]. A description is subsequently given of a preferred combination and blending ratio of the component [A3] in the lamination method which includes the coating technique and the two-stage polymerization technique.

Type and Blending Ratio of Component [A3] Preferred for Lamination Method

When the component [A3] is used in the photochromic curable composition which is preferred for the lamination method, the above component [A3c] is preferably contained in the component [A3] in an amount of 30 to 100 mass % based on 100 mass % of the component [A3].

In the lamination method, it is preferred to use the component [A3c] having a relatively long ethylene oxide chain and a relatively long propylene oxide chain. Since the volume of a cured product can be made smaller in the lamination method than that of the kneading method, an influence such as the shrinkage of the cured product itself under high-temperature and high-humidity conditions becomes small. Meanwhile, since the photochromic cured product is laminated with a plastic lens substrate made of a different material from that of the cured product, the cured product must follow the thermal expansion of the substrate and accordingly, must have high tensile strength. Therefore, in the lamination method, it is preferred that the obtained cured product should be able to be used under high-temperature and high-humidity conditions due to the component [A1] and have mechanical strength due to the component [A3c].

As the component [A3c] represented by the above formula (14), 2,2-bis[4-methacryloxy(polyethoxy)phenyl]propane (k+m=10) is particularly preferred.

In the lamination method, when the component [A3] contains another component different from the component [A3c], the following component is preferably used as the other component [A3]. Examples thereof include an epoxy group-containing (meth)acrylate monomer represented by the above formula (11), a polyfunctional urethane(meth)acrylate monomer, a di(meth)acrylate monomer having 4 or more to less than 20 ethylene glycol chains as recurring units, a polyester oligomer, a silsesquioxane monomer and a monofunctional (meth)acrylate monomer.

As the epoxy group-containing (meth)acrylate monomer represented by the above formula (11), glycidyl methacrylate is preferred.

Preferred examples of the polyfunctional urethane(meth)acrylate monomer include U-4HA (molecular weight of 596, 4 functional groups), U-6HA (molecular weight of 1,019, 6 functional groups), U-6LPA (molecular weight of 818, 6 functional groups) and U-15HA (molecular weight of 2,300, 15 functional groups).

Preferred examples of the di(meth)acrylate monomer having 4 or more to less than 20 ethylene glycol chains as recurring units include polyethylene glycol dimethacrylate having an average molecular weight of 330, polyethylene glycol dimethacrylate having an average molecular weight of 536, polytetramethylene glycol dimethacrylate having an average molecular weight of 736, polyethylene glycol diacrylate having an average molecular weight of 308, polyethylene glycol diacrylate having an average molecular weight of 508, and polyethylene glycol diacrylate having an average molecular weight of 708.

Preferred examples of the polyester oligomer include tetrafunctional polyester oligomers having a molecular weight of 6,000 to 8,000 (such as EB450 of Daicel-UCB Co., Ltd. (having 4 (meth)acrylic groups in one molecule)), and hexafunctional polyester oligomers having a molecular weight of 45,000 to 55,000 (such as EB1830 of Daicel-UCB Co., Ltd. (having 6 (meth)acrylic groups in one molecule)).

Preferred examples of the silsesquioxane monomer include silsesquioxane compounds having a molecular weight of 3,000 to 7,000 and a (meth)acrylic group, which are mixtures having cage-like, ladder-like and random structures.

Preferred examples of the monofunctional (meth)acrylate monomer include 2-isocyanatoethyl methacrylate, γ-methacryloxypropyl trimethoxysilane and γ-methacryloxypropylmethyl dimethoxysilane.

Especially when the content of the component [A3c] is 30 to 99 mass %, the content of the epoxy group-containing (meth)acrylate monomer represented by the above formula (11) is 1 to 70 mass %, the content of the polyfunctional urethane(meth)acrylate monomer is 0 to 30 mass %, the content of the di(meth)acrylate monomer having 4 or more to less than 20 ethylene glycol chains as recurring units is 0 to 50 mass %, the content of the polyester oligomer is 0 to 50 mass %, the content of the silsesquioxane monomer is 0 to 30 mass %, and the content of the monofunctional (meth)acrylate monomer is 0 to 20 mass % based on 100 mass % of the component [A3], the obtained laminate produces a more excellent effect.

In the photochromic curable composition preferred for the lamination method which has been described above, the blending ratios and types of the above monomers are just examples preferred for the lamination method and may also be applied to the kneading method as a matter of course.

(B) Photochromic Compound and Amount Thereof

A description is subsequently given of the photochromic compound as the component (B).

The photochromic compound is used in an amount that enables the acquisition of desired photochromic properties. It is used in an amount of preferably 0.0001 to 10 parts by mass based on 100 parts by mass of the total of the above polymerizable monomers (the polymerizable (meth)acrylic monomer component (A) containing the components [A1], [A2] and [A3]). The photochromic curable composition of the present invention is particularly preferably used for the plastic lens (photochromic cured product) of the kneading method and the plastic lens of the lamination method which is manufactured by the coating or two-stage polymerization technique. When it is used for the plastic lens (photochromic cured product) of the kneading method, its amount is more preferably 0.001 to 2 parts by mass, much more preferably 0.001 to 1 part by mass based on 100 parts by mass of the total of the above polymerizable monomers. When it is used for the plastic lens (photochromic laminate) of the lamination method, its amount is more preferably 0.01 to 7 parts by mass, much more preferably 0.05 to 5 parts by mass based on 100 parts by mass of the total of the above polymerizable monomers.

A compound which exhibits a photochromic function may be used as the photochromic compound. Photochromic compounds such as fulgide compounds, chromene compounds and spirooxazine compounds are well known and may be used in the present invention without restriction. They may be used alone or in combination of two or more. The above fulgide compounds, chromene compounds and spirooxazine compounds are disclosed in, for example, JP-A 2-28154, JP-A 62-288830, WO94/22850 and WO96/14596.

Compounds which were newly discovered by the inventors of the present invention as compounds having excellent photochromic properties are disclosed in, for example, JP-A 2001-114775, JP-A 2001-031670, JP-A 2001-011067, JP-A 2001-011066, JP-A 2000-347346, JP-A 2000-344762, JP-A 2000-344761, JP-A 2000-327676, JP-A 2000-327675, JP-A 2000-256347, JP-A 2000-229976, JP-A 2000-229975, JP-A 2000-229974, JP-A 2000-229973, JP-A 2000-229972, JP-A 2000-219687, JP-A 2000-219686, JP-A 2000-219685, JP-A 11-322739, JP-A 11-286484, JP-A 11-279171, JP-A 10-298176, JP-A 09-218301, JP-A 09-124645, JP-A 08-295690, JP-A 08-176139, JP-A 08-157467, U.S. Pat. No. 5,645,767, U.S. Pat. No. 5,658,501, U.S. Pat. No. 5,961,892, U.S. Pat. No. 6,296,785, Japanese Patent No. 4424981, Japanese Patent No. 4424962, WO2009/136668, WO2008/023828, Japanese Patent No. 4369754, Japanese Patent No. 4301621, Japanese Patent No. 4256985, WO2007/086532, JP-A 2009-120536, JP-A 2009-67754, JP-A 2009-67680, JP-A 2009-57300, Japanese Patent No. 4195615, Japanese Patent No. 4158881, Japanese Patent No. 4157245, Japanese Patent No. 4157239, Japanese Patent No. 4157227, Japanese Patent No. 4118458, JP-A 2008-74832, Japanese Patent No. 3982770, Japanese Patent No. 3801386, WO2005/028465, WO2003/042203, JP-A 2005-289812, JP-A 2005-289807, JP-A 2005-112772, Japanese Patent No. 3522189, WO2002/090342, Japanese Patent No. 3471073, JP-A 2003-277381, WO2001/060811, WO2000/071544, WO2005/028465, WO2011/16582, WO2011/034202, WO2012/121414 and WO2013/042800.

Out of these photochromic compounds, one or more chromene compounds having an indeno(2,1-f)naphtho(1,2-b)pyran skeleton are preferably used from the viewpoints of photochromic properties such as color optical density, initial coloration, durability and fading speed. Out of these chromene compounds, compounds having a molecular weight of 540 or more are preferred as they are particularly excellent in color optical density and fading speed. Examples thereof are given below.

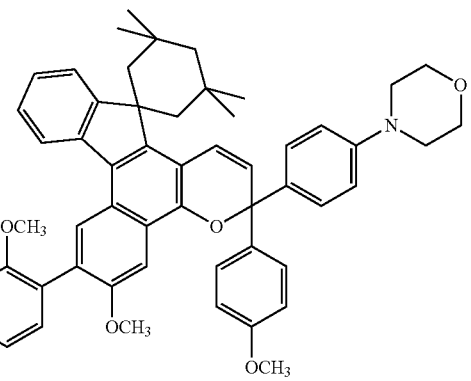

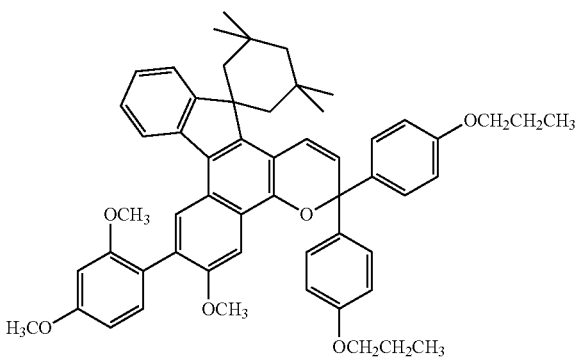

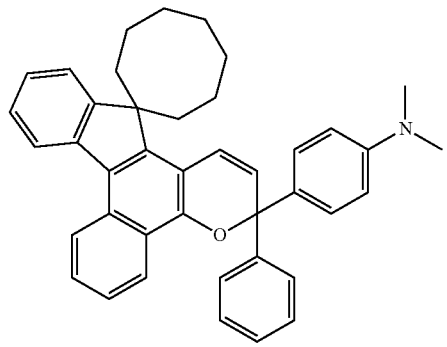

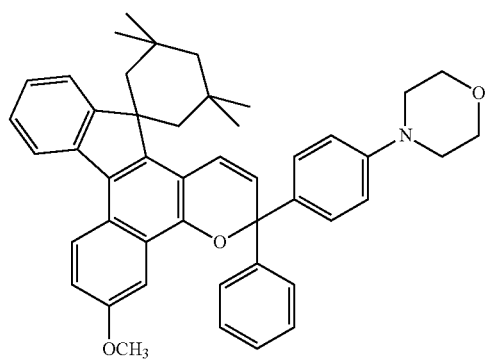

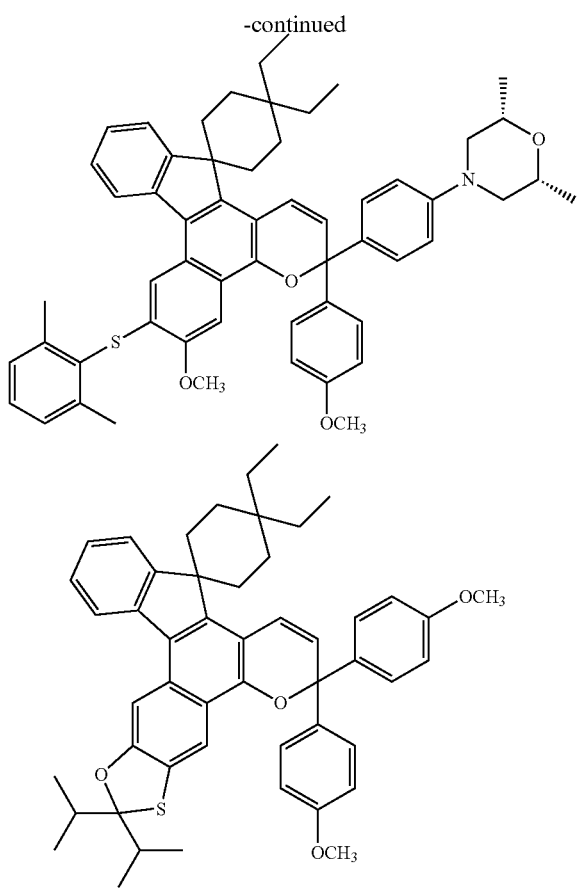

The photochromic curable composition of the present invention may comprise a polymerizable monomer having a polymerizable group different from the (meth)acrylate group (component (C)) in addition to the above component (A) and the above component (B). A description is subsequently given of this component (C).

(C) Polymerizable Monomer Having a Polymerizable Group Different from (Meth)Acrylate Group (Component (C)) and Amount Thereof The polymerizable monomer having a polymerizable group different from a (meth)acrylate group (component (C)) is a polymerizable monomer containing no (meth) acrylate group. Examples thereof include vinyl monomers and allyl monomers.

Although known compounds may be used as the vinyl monomers without restriction, a compound which serves as a polymerization control agent is preferably used in order to improve the moldability of the photochromic curable composition. The vinyl monomers include α-methylstyrene and α-methylstyrene dimer, and a combination of α-methylstyrene and α-methylstyrene dimer is particularly preferred.

Although known compounds may be used as the allyl monomers without restriction, a compound which serves as a chain transfer agent is preferably added in order to improve the photochromic properties (color optical density, fading speed) of the photochromic curable composition. The allyl monomers include methoxy polyethylene glycol allyl ether having an average molecular weight of 550, methoxy polyethylene glycol allyl ether having an average molecular weight of 350, methoxy polyethylene glycol allyl ether having an average molecular weight of 1,500, polyethylene glycol allyl ether having an average molecular weight of 450, methoxy polyethylene glycol-polypropylene glycol allyl ether having an average molecular weight of 750, butoxy polyethylene glycol-polypropylene glycol allyl ether having an average molecular weight of 1,600, methacryloxy polyethylene glycol-polypropylene glycol allyl ether having an average molecular weight of 560, phenoxy polyethylene glycol allyl ether having an average molecular weight of 600, methacryloxy polyethylene glycol allyl ether having an average molecular weight of 430, acryloxy polyethylene glycol allyl ether having an average molecular weight of 420, vinyloxy polyethylene glycol allyl ether having an average molecular weight of 560, styryloxy polyethylene glycol allyl ether having an average molecular weight of 650, and methoxy polyethylene thioglycol allyl thioether having an average molecular weight of 730. In the present invention, methoxy polyethylene glycol allyl ether having an average molecular weight of 550 is particularly preferred.

The amount of the component (C) is preferably 0.1 to 20 parts by mass, most preferably 2 to 12 parts by mass based on 100 parts by mass of the above polymerizable (meth) acrylate component (A). The above components (C) may be used alone or in combination of two or more.

The photochromic curable composition of the present invention may comprise various compounding agents as long as the effect of the present invention is not impaired. A description is subsequently given of the compounding agents.

Photochromic Curable Composition and Other Compounding Agents

The photochromic curable composition of the present invention may be prepared by mixing together the above component (A), the component (B) and the optional component (C). The photochromic curable composition may be mixed with stabilizers such as release agent, ultraviolet absorbent, infrared absorbent, ultraviolet stabilizer, antioxidant, coloring inhibitor, antistatic agent, fluorescent dye, dye, pigment and flavoring agent, additives and polymerization control agent as required.

Especially when an ultraviolet absorbent is used, the durability of the photochromic compound can be further improved advantageously. As the ultraviolet stabilizer, a hindered amine optical stabilizer, a hindered phenol antioxidant and a sulfur-based antioxidant are preferably used. Preferred examples thereof include bis(1,2,2,6,6-pentamethyl-4-piperidyl) sebacate, the ADK STAB LA-52, LA-57, LA-62, LA-63, LA-67, LA-77, LA-82 and LA-87 of ADEKA Corporation, 2,6-di-t-butyl-4-methyl-phenol, 2,6-ethylenebis(oxyethylene)bis[3-(5-t-butyl-4-hydroxy-m-tolyl)propionate], and IRGANOX 1010, 1035, 1075, 1098, 1135, 1141, 1222, 1330, 1425, 1520, 259, 3114, 3790, 5057 and 565 of CIBA SPECIALTY CHEMICALS INC. The amount of this ultraviolet stabilizer is not particularly limited but preferably 0.001 to 10 parts by mass, more preferably 0.01 to 1 part by mass based on 100 parts by mass of the component (A). Particularly when a hindered amine optical stabilizer is used, if it is too large in quantity, there is a difference in the effect of improving durability among compounds, whereby a color shift of the developed color may occur. Therefore, the amount of the hindered amine optical stabilizer is preferably 0.5 to 30 moles, more preferably 1 to 20 moles, much more preferably 2 to 15 moles based on 1 mole of the above photochromic compound.

A thiol such as t-dodecylmercaptan may be added as a polymerization control agent.

Production Methods of Photochromic Cured Product (Kneading Method) and Laminate (Lamination Method), and Polymerization Initiator A polymerization process for obtaining a cured product or laminate from the photochromic curable composition is not particularly limited, and a known radical polymerization process may be employed. As polymerization initiating means, the irradiation of heat, ultraviolet-ray (UV-ray), α-ray, β-ray or γ-ray, or both of them may be used. At this point, a radical polymerization initiator such as the above-described thermal polymerization initiator or optical polymerization initiator is preferably mixed with the photochromic curable composition of the present invention.

In the present invention, when the above polymerization initiator is used, the amount of the polymerization initiator is preferably 0.001 to 10 parts by mass, more preferably 0.01 to 5 parts by mass based on 100 parts by mass of the total of the polymerizable monomers.

Typical examples of the polymerization initiator include thermal polymerization initiators such as diacyl peroxides including benzoyl peroxide, p-chlorobenzoyl peroxide, decanoyl peroxide, lauroyl peroxide and acetyl peroxide; peroxy esters including t-butylperoxy-2-ethyl hexanoate, t-butyl peroxyneodecanoate, cumyl peroxyneodecanoate and t-butyl peroxybenzoate; percarbonates including diisopropyl peroxydicarbonate and di-sec-butyl peroxydicarbonate; and azo compounds such as azobisisobutyronitrile.

When the photochromic curable composition of the present invention is thermally polymerized, temperature out of polymerization conditions has an influence on the properties of the obtained photochromic cured product or laminate. Although temperature is not limited unconditionally as this temperature condition is influenced by the type and amount of the thermal polymerization initiator and the types of the monomers, so-called "tapered polymerization" that polymerization is started at a relatively low temperature, the temperature is gradually raised, and the photochromic curable composition is cured at a high temperature at the end of polymerization is preferably carried out. Since polymerization time differs according to various factors like temperature, it is preferred to determine the optimum time according to these conditions in advance. The conditions are preferably selected to ensure that polymerization is completed in 2 to 24 hours.

Examples of the optical polymerization initiator include acetophenone-based compounds such as 1-phenyl-2-hydroxy-2-methylpropan-1-one, 1-hydorxycyclohexylphenyl ketone and 1-(4-isopropylphenyl)-2-hydroxy-2-methylpropan-1-one; α-dicarbonyl-based compounds such as 1,2-diphenylethanedione and methylphenyl glycoxylate; and acylphosphine oxide-based compounds such as 2,6-dimethylbenzoyl diphenylphosphine oxide, 2,4,6-trimethylbenzoyl diphenylphosphine oxide, 2,4,6-trimethylbenzoyl diphenylphosphinic acid methyl ester, 2,6-dichlorobenzoyl diphenylphosphine oxide and 2,6-dimethoxybezoyl diphenylphosphine oxide. These polymerization initiators may be used alone or in combination of two or more. A thermal polymerization initiator and an optical polymerization initiator may be used in combination. When an optical polymerization initiator is used, a known polymerization accelerator such as a tertiary amine may be used. When the kneading method and the two-stage polymerization technique of the lamination method are employed, a thermal polymerization initiator is preferably used. When the coating technique of the lamination method is employed, an optical polymerization initiator is preferably used.

When the photochromic curable composition of the present invention is optically polymerized, UV intensity out of the polymerization conditions has an influence on the properties of the obtained photochromic cured product or laminate. Since this illuminance condition cannot be limited unconditionally as it is influenced by the type and amount of the optical polymerization initiator and the types of the monomers, conditions are preferably selected to ensure that 50 to 500 mW/cm$^2$ UV light having a wavelength of 365 nm is irradiated for 0.5 to 5 minutes.

A description is subsequently given of examples of the kneading method and the lamination method.

Kneading Method

A typical example of the polymerization process for manufacturing a photochromic cured product is cast polymerization in which the photochromic curable composition of the present invention prepared by mixing a thermal polymerization initiator is injected into a space between glass molds held by an elastomer gasket or a spacer to be polymerized and cured in an air furnace and the obtained cured product is taken out from the mold. When an optical polymerization initiator is used, UV irradiation is carried out for each of the molds, and then the cured product is taken out from the molds.

Lamination Method

Coating Technique

To manufacture a photochromic laminate by the coating technique, the photochromic curable composition of the present invention prepared by mixing an optical polymerization initiator is applied to a plastic lens by spin coating, placed in an inert gas such as nitrogen and then irradiated with UV-rays to obtain a laminate manufactured by the coating technique.

Two-Stage Polymerization Technique

To manufacture a photochromic laminate by the two-stage polymerization technique, a plastic lens substrate is used as one of the glass molds in the above kneading method, and the other glass mold and the plastic lens substrate are spaced apart from each other. The photochromic curable composition is injected into this space in the same manner as in the above kneading method to carry out the same operation.

When the above photochromic laminate is manufactured, to improve the adhesion of the obtained laminate, the surface of the plastic lens substrate in use may be subjected to a chemical treatment with an alkali solution or acid solution, or a physical treatment such as corona discharge, plasma discharge or polishing, and further an adhesion layer may be formed on the laminate.

Characteristic Properties of Photochromic Cured Product or Laminate, and Post-Treatment In the photochromic cured product or laminate obtained by polymerizing the photochromic curable composition of the present invention in accordance with the above method, an appearance defect such as a crack can be suppressed even under high-temperature and high-humidity conditions, and a photochromic plastic lens having excellent photochromic properties can be obtained. In the photochromic laminate, an appearance defect such as a crack produced during molding can be suppressed, and excellent surface hardness can be provided.

Further, the photochromic cured product or laminate obtained by the above method may be subjected to the following treatment according to purpose. That is, it may be dyed with a dye such as a disperse dye and subjected to an antireflection treatment such as the application of a silane coupling agent or a hard coating agent comprising silicon, zirconium, antimony, aluminum, tin or tungsten sol as the main component, the deposition of a thin film of a metal oxide such as $SiO_2$, $TiO_2$ or $ZrO_2$, or the formation of a thin film of an organic polymer by coating, an antistatic treatment and a secondary treatment.

EXAMPLES

The following examples are provided for the purpose of further illustrating the present invention but are in no way to be taken as limiting.

The compounds used in Examples are given below. The production method of the component [A1] is described hereinbelow.

Production Example

Production of Component [A1]

(Production Method of Monomer M-1)

108 g (2.5 moles) of acrylic acid, 300 g of benzene, 11 g (0.06 mole) of p-toluenesulfonic acid and 0.3 g (700 ppm (based on polycarbonate diol)) of p-methoxyphenol were added to 300 g (0.6 mole) of a polycarbonate diol (number average molecular weight of 500) obtained by phosgenating hexamethylene glycol (50 mol %) and pentamethylene glycol (50 mol %) to carry out a reaction under reflux. Water produced by the reaction was azeotropically boiled with a solvent and removed to the outside of the system by a separator, and the solvent was returned to a reaction vessel. The conversion rate of the reaction was confirmed with the amount of water removed from the reaction system, and the reaction was terminated when it was confirmed that 21.6 g of water was removed from the reaction system. After the reaction product was dissolved in 600 g of benzene and neutralized with 5% sodium hydrogen carbonate, it was washed with 300 g of 20% salt water 5 times to obtain 210 g of a transparent liquid.

Compositions and blending ratios are shown in Table 1.

(Production Method of Monomers M-2 to M-6)

The production method of monomers M-2 to M-6 as the component [A1] was the same as the production method of the monomer M-1 except that the polycarbonate diol and (meth)) acrylic acid were used and the amounts of water removed from the reaction system were shown in Tables 1 and 2.

TABLE 1

| | Polycarbonate diol | | | | | Component [A1] | | | |
|---|---|---|---|---|---|---|---|---|---|
| | A,A' | a | (meth) acrylic acid | amount of water (mol %) | R¹ | R² | | A, A' | a |
| M-1 | —(CH₂)₆— and 50 mol % <br> —(CH₂)₅— 50 mol % | 3 | Acrylic acid | 200 | H | 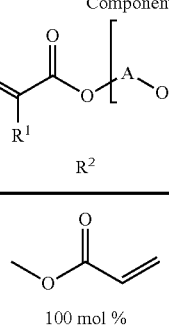 <br> 100 mol % | | —(CH₂)₆— and 50 mol % <br> —(CH₂)₅— 50 mol % | 3 |
| M-2 | —(CH₂)₄— and 50 mol % <br> —(CH₂)₃— 50 mol % | 5 | Methacrylic acid | 200 | CH3 | 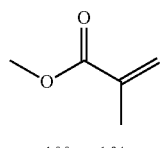 <br> 100 mol % | | —(CH₂)₄— and 50 mol % <br> —(CH₂)₃— 50 mol % | 5 |
| M-3 | —(CH₂)₆— | 3 | Methacrylic acid | 200 | CH3 | 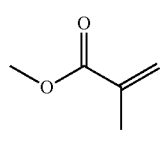 <br> 100 mol % | | —(CH₂)₆— | 3 |
| M-4 | —(CH₂)₆— and 50 mol % <br> —(CH₂)₅— 50 mol % | 3 | Methacrylic acid | 170 | CH3 | 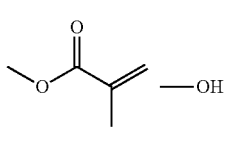 <br> 70 mol % | —OH <br> 30 mol % | —(CH₂)₆— and 50 mol % <br> —(CH₂)₅— 50 mol % | 3 |

TABLE 2

| | Polycarbonate diol | | | | Component [A1] | | | |
|---|---|---|---|---|---|---|---|---|
| | A, A' | a | (meth) Acrylic acid | Amount of water (mol %) | $R^1$ | $R^2$ | A, A' | a |
| M-5 | —(CH$_2$)$_6$— and 50 mol % <br> —(CH$_2$)$_5$— 50 mol % | 8 | Acrylic acid | 200 | H | methacrylate/acrylate group (100 mol %) | —(CH$_2$)$_6$— and 50 mol % <br> —(CH$_2$)$_5$— 50 mol % | 8 |
| M-6 | branched alkyl and 50 mol % <br> branched alkyl 50 mol % | 3 | Acrylic acid | 200 | H | acrylate group (100 mol %) | branched alkyl and 50 mol % <br> branched alkyl 50 mol % | 3 |

Component [A2]
TMPT: trimethylolpropane trimethacrylate
D-TMPT: ditrimethylolpropane tetramethacrylate
A-TMMT: Tetramethylolmethane tetraacrylate
Component [A3]
Component [A3a]
APG200: tripropylene glycol diacrylate
3PG: tripropylene glycol dimethacrylate
4PG: tetrapropylene glycol dimethacrylate
Component [A3b]
BPE100: 2,2-bis[4-(methacryloxyethoxy)phenyl]propane (average chain length of ethylene glycol chains of 2.6, average molecular weight of 478)
Component [A3c]
BPE500: 2,2-bis[4-(methacryloxy•polyethoxy)phenyl]propane (average chain length of ethylene glycol chains of 10, average molecular weight of 804)
Other component [A3]
A200: tetraethylene glycol diacrylate
A400: polyethylene glycol diacrylate (average chain length of ethylene glycol chains of 9, average molecular weight of 508)
APG400: polypropylene glycol diacrylate (average chain length of propylene glycol chains of 7, average molecular weight of 536)
M90G: 'M90G' monofunctional methacrylate(methoxy polyethylene glycol methacrylate) of Shin-Nakamura Chemical Co., Ltd.
4G: tetraethylene glycol dimethacrylate
3G: triethylene glycol dimethacrylate
9G: polyethylene glycol dimethacrylate (average chain length of ethylene glycol chains of 9, average molecular weight of 536)
14G: polyethylene glycol dimethacrylate (average chain length of ethylene glycol chains of 14, average molecular weight of 736)

U2PPA: 'U-2PPA' bifunctional urethane methacrylate (acrylic equivalent of 240, molecular weight of 482) of Shin-Nakamura Chemical Co., Ltd.
EB4858: bifunctional urethane methacrylate (acrylic equivalent of 227) of Daicel-UCB Co., Ltd.
U4HA: 'U-4HA' tetrafunctional urethane acrylate (molecular weight of 596) of Shin-Nakamura Chemical Co., Ltd.
GMA: glycidyl methacrylate
MAPEG: polyethylene glycol methacrylate (average molecular weight of 526)
MA1: γ-methacryloxypropyl trimethoxysilane
MA2: 2-isocyanatoethyl methacrylate
PMS1: silsesquioxane monomer
<Synthesis of PMS1>

248 ml of ethanol and 54 g (3.0 moles) of water were added to 248 g (1.0 mole) of 3-trimethoxysilylpropyl methacrylate, and 0.20 g (0.005 mole) of sodium hydroxide as a catalyst was added to the mixture to carry out a reaction at 30° C. for 3 hours. After it was confirmed that the raw materials were gone, the reaction product was neutralized with diluted hydrochloric acid, and 174 ml of toluene, 174 ml of heptane and 174 g of water were added to remove a water layer. Thereafter, an organic layer was rinsed until the water layer became neutral, and a silsesquioxane monomer (PMS1) was obtained by concentrating the solvent. It was confirmed by 1H-NMR that the raw materials were completely consumed. Also, it was confirmed by 29Si-NMR that the obtained product was a mixture having cage-like, ladder-like and random structures.

When the molecular weight of the silsesquioxane monomer (PMS1) was measured by gel permeation chromatography (GPC), the weight average molecular weight was 4,800.

Photochromic Compound (B)

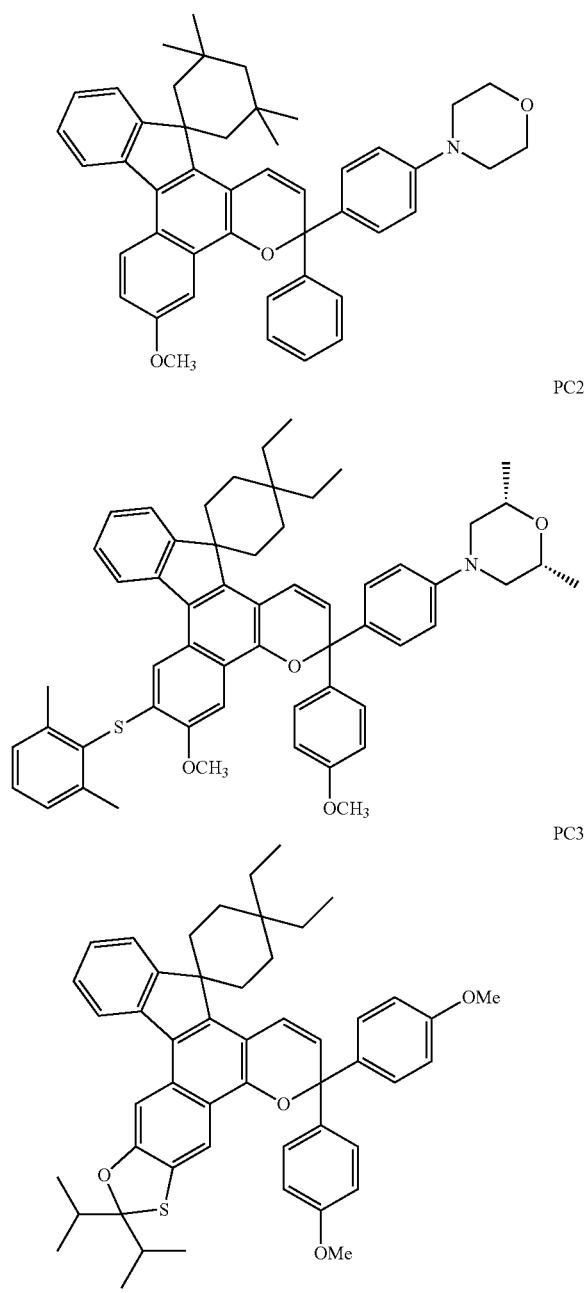

Component (C)
MPEAE: methoxy polyethylene glycol allyl ether having an average molecular weight of 550
α-MS: α-methylstyrene
MSD: α-methylstyrene dimer
Other Compounding Agents (Additives)
Stabilizer
HALS: bis(1,2,2,6,6-pentamethyl-4-piperidyl)sebacate (molecular weight of 508)
HP: ethylenebis(oxyethylene)bis[3-(5-tert-butyl-4-hydroxy-m-tolyl)propionate] (Irganox245 of CIBA SPECIALTY CHEMICALS INC.)

Thermal Polymerization Initiator
ND: t-butyl peroxyneodecanoate (trade name: Perbutyl ND, manufactured by NOF Corporation)
O: 1,1,3,3-tetramethylbutyl peroxy-2-ethylhexanoate (trade name: Perocta O, manufactured by NOF Corporation)
Optical Polymerization Initiator
PI: phenylbis(2,4,6-trimethylbenzoyl)-phosphine oxide (trade name: Irgacure819, manufactured by BASF)

Example 1 (Kneading Method)

16 parts by mass of M-1 as the component [A1], 10 parts by mass of TMPT as the component [A2], 43 parts by mass of 3PGX, 25 parts by mass of EB4858, 5 parts by mass of M90G and 1 part by mass of glycidyl methacrylate as the component [A3], 0.5 part by mass of αMS and 1.5 parts by mass of MSD as the component (C), 0.1 part by mass of HALS as a stabilizer which is another compounding agent (additive), 0.03 part by mass of PC1, 0.01 part by mass of PC2 and 0.03 part by mass of PC3 as the component (B), and 1 part by mass of perbutyl ND and 0.1 part by mass of perocta O as polymerization initiators were fully mixed together. The amounts of these components are shown in Table 3.

The obtained mixed solution (photochromic curable composition) was injected into a mold composed of a glass sheet and a gasket made of an ethylene-vinyl acetate copolymer to polymerize substantially all the amounts of the polymerizable monomers by cast polymerization. Polymerization was carried out in an air furnace by gradually raising the temperature from 30° C. to 90° C. over 18 hours and keeping the temperature at 90° C. for 2 hours. After the end of polymerization, the photochromic cured product was taken out from the glass mold (the photochromic cured product having a diameter of 8 cm was manufactured). 30 photochromic cured products were manufactured in accordance with this method.

The obtained photochromic cured products (thickness of 2 mm) were used as specimens and irradiated with light having a beam intensity at 365 nm of 2.4 mW/cm$^2$ on the surface of the polymer and at 245 nm of 24 μW/cm$^2$ from the L-2480 (300W) SHL-100 xenon lamp of Hamamatsu Photonics K.K. through an aero-mass filter (of Corning Incorporated) at 20° C.±1° C. for 120 seconds to develop color so as to measure the photochromic properties of the above cured products. The photochromic properties, water absorption coefficient, properties under high-temperature and high-humidity conditions, mechanical strength and moldability of each of the above photochromic cured products were evaluated by the following methods and shown in Table 6. The following evaluations were made on 10 photochromic cured products and represented by average values.

1) Maximum absorption wavelength (λmax): maximum absorption wavelength after color development obtained by the spectrophotometer (instantaneous multi-channel photodetector MCPD1000) of Otsuka Electronics Co., Ltd. The maximum absorption wavelength is connected with color at the time of color development.

2) Color optical density {ϵ(120)−ϵ(0)}: difference between absorbance {ϵ(120)} after 120 seconds of irradiation at the above maximum absorption wavelength and the above absorbance ϵ(0). It can be said that as this value becomes larger, photochromic properties become more excellent. The color which was developed outdoors was evaluated visually.

3) Fading speed [t1/2(sec.)]: time elapsed until the absorbance at the above maximum wavelength of the specimen drops to ½ of {ϵ(120)−ϵ(0)} when irradiation is continued for 120 seconds and then stopped. It can be said that as the time becomes shorter, photochromic properties become more excellent.

4) Water absorption coefficient (%): The weight (M1) of the photochromic cured product was measured after it was dried in a 110° C. oven for 12 hours to remove water therefrom and then the weight (M2) thereof was measured after it was immersed in 40° C. distilled water for 7 days to obtain an increase in the weight of the photochromic cured product. The water absorption coefficient (%) was obtained by the following formula.

$$\{(M2-M1)/M1 \times 100\}$$

5) Crack test: A crack test was carried out by visually observing the surfaces of 10 photochromic cured products which were immersed in 40° C. distilled water for 7 days in the above measurement of water absorption coefficient and dried in a 110° C. oven for 2 hours. The evaluation method is to count the number of cracked photochromic cured products out of 10 photochromic cured products.

6) L-scale Rockwell hardness (HL): After the above cured products were kept in a room at 25° C. for one day, the L-scale Rockwell hardness of each of them was measured with the Rockwell hardness meter (model: AR-10) of Akashi Co., Ltd.

7) Tensile strength (kgf): A disk-like test specimen having a thickness of 2 mm and a diameter of 5 cm was molded from the obtained cured product, two holes having a diameter of 2 mm were formed by drilling in the disk-like test specimen at positions 4 mm from the circumference of the specimen as the center points thereof on the same line as the diameter of the specimen, and stainless steel rods having a diameter of 1.6 mm were inserted into the two respective holes and fixed to the upper and lower chucks of a tensile tester while they penetrated the specimen to carry out a tensile test at a speed of 5 mm/min so as to measure the tensile strength of the specimen. When tensile strength is evaluated with typical CR-39 used for spectacle lenses, it is 18 kgf. When it is less than 12 kgf, the specimen has a problem with strength as a spectacle lens.

8) Refractive index: The refractive index was measured at 20° C. with the refractometer of Atago Mfg. Co., Ltd. Bromonaphthalene or methylene iodide was used as a contact solution to measure the refractive index at a D-ray.

9) Moldability: The optical distortion of the molded photochromic cured product was visually observed under crossed nicols. This was evaluated based on the following criteria.

1: no optical distortion was observed in 10 photochromic cured products

2: as an average of 10 photochromic cured products, optical distortion is slightly observed in a portion 1 cm or less from the end 3: as an average of 10 photochromic cured products, optical distortion is observed in a portion more than 1 cm to 3 cm or less from the end.

4: optical distortion is observed over the entire surfaces of 10 photochromic cured products 10) Cloudiness (dispersibility of monomers): The cloudiness of each of the molded photochromic cured products was visually evaluated under crossed nicols. This was evaluated based on the following criteria.

1: not clouded

2: slightly clouded though they have no problem as a product

3: clouded and cannot be used as a product

Examples 2 to 16, Comparative Examples 1 to 8
(Kneading Method)

Photochromic cured products were manufactured and evaluated in the same manner as in Example 1 except that photochromic curable compositions shown in Table 3 (Examples 2 to 8), Table 4 (Examples 9 to 16) and Table 5 (Comparative Examples) were used. The results are shown in Table 6 (Examples) and Table 7 (Comparative Examples).

TABLE 3

| Example | Component [A1] (parts by mass) | Component [A2] (parts by mass) | Component [A3] (parts by mass) | Component (B) (parts by mass) | Component (C) (parts by mass) | Additive (parts by mass) | Initiator (parts by mass) |
|---|---|---|---|---|---|---|---|
| 1 | M-1 (16) | TMPT (10) | 3PG(43)/EB4858(25)/ M90G(5)/GMA(1) | PC1(0.03)/ PC2(0.01)/PC3(0.03) | MPEAE(1)/α MS(0.5)/ MSD(1.5) | HALS (0.1) | ND(1) O(0.1) |
| 2 | M-2 (20) | TMPT (7) | 4PG(48)/U2PPA(20)/ A400(8)/GMA(1) | PC1(0.03)/ PC2(0.01)/PC3(0.03) | MPEAE(1)/α MS(0.5)/ MSD(1.5) | HALS (0.1) | ND(1) O(0.1) |
| 3 | M-3 (5) | D-TMPT (18) | 3PG(35)/EB4858(25)/ A200(11)/M90G(5)/ GMA(1) | PC1(0.03)/ PC2(0.01)/PC3(0.03) | α MS(0.5)/MSD(1.5) | HALS (0.1) | ND(1) O(0.1) |
| 4 | M-4 (10) | A-TMMT (10) | BPE-100(28)/4G(35)/ BPE-500(5)/APG400(6)/ GMA(1) | PC1(0.03)/ PC2(0.01)/PC3(0.03) | MPEAE(1)/α MS(5)/ MSD(2) | HALS (0.1) | ND(1) |
| 5 | M-1 (35) | TMPT (15) | BPE-100(28)/4G(35)/ BPE-500(5)/M90G(6)/ GMA(1) | PC1(0.03)/ PC2(0.01)/PC3(0.03) | α MS(5)/MSD(2) | HALS (0.1) | ND(1) O(0.1) |
| 6 | M-2 (15) | D-TMPT (10) | 3PG(43)/EB4858(30)/ M90G(4)/GMA(1) | PC1(0.03)/ PC2(0.01)/PC3(0.03) | α MS(0.5)/MSD(1.5) | HALS (0.1) | ND(1) O(0.1) |
| 7 | M-2 (31) | TMPT (5) | 3PG(34)/EB4858(20)/ 4G(5)/A400(5)/GMA(1) | PC1(0.03)/ PC2(0.01)/PC3(0.03) | MPEAE(1)/α MS(0.5)/ MSD(1.5) | HALS (0.1) | ND(1) O(0.1) |
| 8 | M-4 (20) | TMPT (15) | 3PG(39)/EB4858(25)/ M90G(5)/GMA(1) | PC1(0.03)/ PC2(0.01)/PC3(0.03) | α MS(0.5)/MSD(1.5) | HALS (0.1) | ND(1) O(0.1) |

TABLE 4

| Example | Component [A1] (parts by mass) | Component [A2] (parts by mass) | Component [A3] (parts by mass) | Component (B) (parts by mass) | Component (C) (parts by mass) | Additive (parts by mass) | Initiator (parts by mass) |
|---|---|---|---|---|---|---|---|
| 9 | M-1 (10) | TMPT (4) | BPE-100(30)/4G(40)/BPE-500(5)/GMA(1) | PC1(0.03)/PC2(0.01)/PC3(0.03) | MPEAE(2)/α MS(6)/MSD(2) | HALS (0.1) | ND(1) |
| 10 | M-1 (16) | TMPT (10) | 3PG(43)/EB4858(25)/M90G(5)/GMA(1) | PC1(0.03)/PC2(0.01)/PC3(0.03) | MPEAE(5)/α MS(8)/MSD(2) | HALS (0.1) | ND(1) O(0.1) |
| 11 | M-5 (7) | TMPT (10) | BPE-100(29)/4G(35)/BPE-500(5)/M900(2)/GMA(1) | PC1(0.03)/PC2(0.01)/PC3(0.03) | MPEAE(2)/α MS(5)/MSD(2) | HALS (0.1) | ND(1) |
| 12 | M-6 (14) | TMPT (11) | 3PG(43)/U2PPA(20)/A200(11)/GMA(1) | PC1(0.03)/PC2(0.01)/PC3(0.03) | MPEAE(1)/α MS(0.5)/MSD(1.5) | HALS (0.1) | ND(1) O(0.1) |
| 13 | M-3 (12) | TMPT (22) | 3PG(43)/EB4858(20)/M90G(3)/GMA 2) | PC1(0.03)/PC2(0.01)/PC3(0.03) | MPEAE(1)/α MS(0.5)/MSD(1.5) | HALS (0.1) | ND(1) O(0.1) |
| 14 | M-4 (15) | TMPT (13) | 3PG(38)/EB4858(25)/4G(5)/A400(5)/GMA(1) | PC1(0.03)/PC2(0.01)/PC3(0.03) | MPEAE(2)/α MS(0.5)/MSD(1.5) | HALS (0.1) | ND(1) O(0.1) |
| 15 | M-1 (4) | TMPT (10) | 3PG(43)/EB4858(25)/M90G(1)/A200(16)/GMA(1) | PC1(0.03)/PC2(0.01)/PC3(0.03) | MPEAE(1)/α MS(0.5)/MSD(1.5) | HALS (0.1) | ND(1) O(0.1) |
| 16 | M-1 (55) | TMPT (10) | 3PG(20)/E54858(10)/M90G(4)/GMA(1) | PC1(0.03)/PC2(0.01)/PC3(0.03) | α MS(0.5)/MSD(1.5) | HALS (0.1) | ND(1) O(0.1) |

TABLE 5

| Comparative Example | Component [A1] (parts by mass) | Component [A2] (parts by mass) | Component [A3] (parts by mass) | Component (B) (parts by mass) | Component (C) (parts by mass) | Additive (parts by mass) | Initiator (parts by mass) |
|---|---|---|---|---|---|---|---|
| 1 | — | TMPT (10) | 3PG(49)/EB4858(25)/A400(15)/GMA(1) | PC1(0.03)/PC2(0.01)/PC3(0.03) | MSD(2) | HALS (0.1) | ND(1) O(0.1) |
| 2 | — | TMPT (30) | 9PG(30)/4G(20)/3G(5)/GMA(15) | PC1(0.03)/PC2(0.01)/PC3(0.03) | — | HALS (0.1) | ND(1) O(0.1) |
| 3 | — | TMPT (5) | MAPEG(5)/4G(77)/GMA(7) | PC1(0.03)/PC2(0.01)/PC3(0.03) | α MS(5)/MSD(1) | HALS (0.1) | ND(1) O(0.1) |
| 4 | — | TMPT (8) | BPE-100(49)/4G(32)/A200(5)/BPE-500(5)/GMA(1) | PC1(0.03)/PC2(0.01)/PC3(0.03) | α MS(9)/MSD(2) | HALS (0.1) | ND(1) |
| 5 | — | TMPT (5) | BPE-100(17)/3PG(55)/A200(5)/GMA(10) | PC1(0.03)/PC2(0.01)/PC3(0.03) | α MS(7)/MSD(1) | HALS (0.1) | ND(1) O(0.1) |
| 6 | — | TMPT (5) | 3PG(54)/BPE-100(18)/A400(5)/GMA(10) | PC1(0.03)/PC2(0.01)/PC3(0.03) | α MS(7)/MSD(1) | HALS (0.1) | ND(1) O(0.1) |
| 7 | M-1 (16) | — | 3PG(49)/EB4858(25)/A400(9)/GMA(1) | PC1(0.03)/PC2(0.01)/PC3(0.04) | α MS(0.5)/MSD(1.5) | HALS (0.1) | ND(1) O(0.1) |
| 8 | — | TMPT (10) | 3PG(43)/EB4858(25)/A400(16)/M90G(5)/GMA(1) | PC1(0.03)/PC2(0.01)/PC3(0.03) | MPEAE(1)/α MS(0.5)/MSD(1.5) | HALS (0.1) | ND(1) O(0.1) |

TABLE 6

| Example | Maximum absorption wavelength (λmax) | Color optical density | Fading speed (sec) | L-scale Rockwell hardness (HL) | Water absorption coefficient (%) | Number of cracked cured products | Tensile strength (kgf) | Refractive index | Moldability | Cloudiness |
|---|---|---|---|---|---|---|---|---|---|---|
| 1 | 588 | 1.1 | 55 | 79 | 1.7 | 0 | 22 | 1.50 | 1 | 1 |
| 2 | 587 | 0.9 | 65 | 84 | 1.7 | 0 | 24 | 1.50 | 1 | 1 |
| 3 | 588 | 0.9 | 63 | 83 | 2.1 | 2 | 17 | 1.49 | 1 | 2 |
| 4 | 591 | 0.9 | 60 | 76 | 1.7 | 0 | 33 | 1.54 | 1 | 2 |
| 5 | 590 | 1.0 | 50 | 67 | 1.6 | 0 | 21 | 1.50 | 2 | 1 |
| 6 | 587 | 0.9 | 68 | 78 | 1.8 | 1 | 24 | 1.50 | 1 | 1 |
| 7 | 588 | 0.9 | 59 | 68 | 1.8 | 0 | 23 | 1.50 | 2 | 1 |
| 8 | 588 | 0.9 | 53 | 80 | 1.7 | 0 | 17 | 1.50 | 1 | 2 |
| 9 | 590 | 0.8 | 75 | 75 | 1.9 | 1 | 37 | 1.54 | 1 | 1 |
| 10 | 588 | 1.1 | 50 | 66 | 1.9 | 0 | 23 | 1.50 | 2 | 1 |
| 11 | 590 | 1.0 | 86 | 79 | 1.8 | 0 | 32 | 1.54 | 2 | 1 |
| 12 | 588 | 1.1 | 75 | 88 | 1.8 | 1 | 21 | 1.50 | 1 | 1 |
| 13 | 588 | 1.0 | 69 | 82 | 1.7 | 0 | 16 | 1.50 | 1 | 2 |
| 14 | 588 | 1.0 | 63 | 79 | 1.7 | 0 | 21 | 1.50 | 1 | 2 |

TABLE 6-continued

| Example | Maximum absorption wavelength (λmax) | Color optical density | Fading speed (sec) | L-scale Rockwell hardness (HL) | Water absorption coefficient (%) | Number of cracked cured products | Tensile strength (kgf) | Refractive index | Moldability | Cloudiness |
|---|---|---|---|---|---|---|---|---|---|---|
| 15 | 588 | 1.0 | 65 | 82 | 2.2 | 3 | 22 | 1.50 | 1 | 1 |
| 16 | 588 | 1.0 | 50 | 50 | 1.8 | 1 | 13 | 1.50 | 2 | 2 |

TABLE 7

| Comparative Example | Maximum absorption wavelength (λmax) | Color optical density | Fading speed (sec) | L-scale Rockwell hardness (HL) | Water absorption coefficient (%) | Number of cracked cured product | Tensile strength (kgf) | Refractive index | Moldabilit | Cloudiness |
|---|---|---|---|---|---|---|---|---|---|---|
| 1 | 588 | 0.9 | 70 | 84 | 3.5 | 7 | 22 | 1.50 | 1 | 1 |
| 2 | 588 | 0.8 | 90 | 97 | 3.8 | 6 | 14 | 1.52 | 2 | 1 |
| 3 | 588 | 0.8 | 98 | 88 | 4.0 | 7 | 21 | 1.52 | 1 | 1 |
| 4 | 590 | 1.0 | 82 | 82 | 3.6 | 6 | 24 | 1.54 | 2 | 2 |
| 5 | 588 | 0.7 | 100 | 88 | 1.5 | 0 | 18 | 1.52 | 1 | 1 |
| 6 | 589 | 0.7 | 102 | 92 | 2.2 | 2 | 19 | 1.52 | 1 | 1 |
| 7 | 588 | 0.6 | 130 | 90 | 1.8 | 0 | 22 | 1.50 | 1 | 1 |
| 8 | 588 | 1.0 | 60 | 79 | 3.9 | 7 | 20 | 1.50 | 1 | 1 |

As obvious from the above Examples and Comparative Examples, cured products obtained by polymerizing the photochromic curable compositions of the present invention are excellent in not only photochromic properties but also mechanical properties. In Comparative Examples 1 to 4 and 8, the cured products have a high water absorption coefficient and are cracked when they are used under high-temperature and high-humidity conditions. In Comparative Examples 5 to 7, the cured products have poor photochromic properties (color optical density, fading speed).

Example 17 (Lamination Method: Coating Technique)

20 parts by mass of M-1 as the component [A1], 15 parts by mass of TMPT and 15 parts by mass of D-TMPT as the component [A2], 25 parts by mass of BPE-500, 20 parts by mass of 14G and 5 parts by mass of GMA as the component [A3], 1.2 parts by mass of PC1, 0.4 part by mass of PC2 and 1.2 parts by mass of PC3 as the component (B), 3 parts by mass of HALS and 3 parts by mass of HP as stabilizers which are other compounding agents (additives), 0.3 part by mass of PI as a polymerization initiator and 0.1 part by mass of L7001 of Dow Corning Toray Co., Ltd. as a leveling agent were added and fully mixed together under agitation to obtain a photochromic curable composition for use in the coating technique. The amounts of these components are shown in Table 8.

Then, a thiourethane-based plastic lens having a center thickness of 2 mm and a refractive index of 1.60 was prepared as an optical substrate. This thiourethane-based plastic lens was alkali etched by using a 10% sodium hydroxide aqueous solution at 50° C. for 5 minutes and then fully rinsed with distilled water in advance.

A moisture curable primer (trade name; TR-SC-P, manufactured by Tokuyama Corporation) was applied to the surface of the above plastic lens at a revolution of 70 rpm for 15 seconds and then at 1,000 rpm for 10 seconds by means of a spin coater (1H-DX-2 of MIKASA Co., Ltd.). Then, about 2 g of the photochromic curable composition obtained above was applied to the coating film at a revolution of 60 rpm for 40 seconds and then at 600 rpm for 10 to 20 seconds by spin coating to form a photochromic coating layer having a thickness of 40 μm. The lens having the coating agents coated on the surface was irradiated with light from a metal halide lamp having an output of 200 mW/cm$^2$ in a nitrogen gas atmosphere for 90 seconds to cure the coating film. Thereafter, the plastic lens was heated at 110° C. for 1 hour to manufacture a photochromic laminate having a photochromic layer.

The measurement of the photochromic properties, water absorption coefficient and a crack test of the obtained photochromic laminate were carried out like the photochromic cured product. The following Vickers hardness, adhesion and appearance of the photochromic laminate were evaluated as well. The results are shown in Table 9.

[Evaluations of Specimen]

11) Vickers Hardness

Vickers hardness was measured with the PMT-X7A micro-Vickers hardness meter (of Matsuzawa Co., Ltd.). A square pyramid type diamond indenter was used to carry out the evaluation of Vickers hardness under a load of 10 gf for an indenter retention time of 30 seconds. After this measurement was carried out 4 times, an average value of three measurement data excluding a first value with a large measurement error was given.

12) Adhesion

Adhesion was evaluated by a cross-cut tape test in accordance with JISD-0202. That is, a cutter knife was used to make cuts in the surface of the photochromic layer of the obtained photochromic laminate at intervals of about 1 mm so as to form 100 squares. A cellophane adhesive tape (Cellotape (registered trademark) of Nichiban Co., Ltd.) was strongly attached to the surface and then peeled off at a stretch in a 90° direction from the surface to evaluate the number of squares left behind of the photochromic layer.

13) Evaluation of Appearance

As for the evaluation of an appearance, 10 obtained photochromic laminates were observed visually to count the number of laminates having an appearance defect such as a crack in a photopolymerization step or a heating step after that.

Examples 18 to 24 and 33, Comparative Examples 9 to 11 (Lamination Method: Coating Technique)

Photochromic laminates were manufactured and evaluated in the same manner as in Example 17 except that photochromic curable compositions shown in Table 8 (Examples 18 to 24 and 33, Comparative Examples 9 to 11) were used. The results are shown in Table 9.

As obvious from the above Examples 17 to 24 and 33 and Comparative Examples 9 to 11, photochromic laminates obtained from the photochromic curable compositions of the present invention by the coating technique are excellent in not only photochromic properties but also water absorption coefficient, Vickers hardness, appearance evaluation and crack test. In contrast to this, in Comparative Examples 9 to 11, photochromic laminates which satisfy all the physical properties such as water absorption coefficient, Vickers hardness, appearance evaluation and crack test at the same time were not obtained.

TABLE 8

| | Component [A1] (Parts by mass) | Component [A2] (Parts by mass) | Component [A3] (Parts by mass) | Component (B) (Parts by mass) | Additive (parts by mass) | Initiator (parts by mass) |
|---|---|---|---|---|---|---|
| Ex. 17 | M-1 (20) | TMPT(15)/ D-TMPT(15) | BPE-500(25)/ 14G(20)/GMA(5) | PC1(1.2)/ PC2(0.4)/PC3(1.2) | HALS(3)/ HP(3) | PI (0.3) |
| Ex. 18 | M-1 (10) | TMPT(17)/ D-TMPT(17) | BPE-500(25)/14G(25)/ PMS1(5)/GMA(1) | PC1(1.2)/ PC2(0.4)/PC3(1.2) | HALS(3)/ HP(3) | PI (0.3) |
| Ex. 19 | M-1 (3) | TMPT(20) | BPE-500(32)/4G(20)/ 14G(20)/GMA(5) | PC1(1.2)/ PC2(0.4)/PC3(1.2) | HALS(3)/ HP(3) | PI (0.3) |
| Ex. 20 | M-1 (30) | D-TMPT(35) | BPE-500(20)/U4HA(5)/ 14G(5)/GMA(5) | PC1(1.2)/ PC2(0.4)/PC3(1.2) | HALS(3)/ HP(3) | PI (0.3) |
| Ex. 21 | M-1 (47) | TMPT(15)/ D-TMPT(30) | BPE-500(3)/GMA(5) | PC1(1.2)/ PC2(0.4)/PC3(1.2) | HALS(3)/ HP(3) | PI (0.3) |
| Ex. 22 | M-1 (53) | TMPT(15)/ D-TMPT(30) | GMA(2) | PC1(1.2)/ PC2(0.4)/PC3(1.2) | HALS(3)/ HP(3) | PI (0.3) |
| Ex. 23 | M-2 (20) | TMPT(15)/ D-TMPT(15) | BPE-500(25)/PMS1(10)/ 14G(10)/GMA(5) | PC1(1.2)/ PC2(0.4)/PC3(1.2) | HALS(3)/ HP(3) | PI (0.3) |
| Ex. 24 | M-3 (20) | TMPT(20) | BPE-500(25)/PMS1(10)/ 14G(10)/M90G(5)/ GMA(5)/MA1(5) | PC1(1.2)/ PC2(0.4)/PC3(1.2) | HALS(3)/ HP(3) | PI (0.3) |
| Ex. 33 | M-1 (15) | TMPT(19) | BPE-500(40)/PMS1(10)/ 14G(15)/GMA(1) | PC1(1.2)/ PC2(0.4)/PC3(1.2) | HALS(3)/ HP(3) | PI (0.3) |
| C. Ex. 9 | — | TMPT(25) | BPE-500(35)/ 14G(35)/GMA(5) | PC1(1.2)/ PC2(0.4)/PC3(1.2) | HALS(3)/ HP(3) | PI (0.3) |
| C. Ex. 10 | M-1 (20) | — | BPE-500(40)/ 14G(35)/GMA(5) | PC1(1.2)/ PC2(0.4)/PC3(1.2) | HALS(3)/ HP(3) | PI (0.3) |
| C. Ex. 11 | M-1 (50) | TMPT(30)/ D-TMPT(20) | — | PC1(1.2)/ PC2(0.4)/PC3(1.2) | HALS(3)/ HP(3) | PI (0.3) |

Ex.: Example, C. Ex.: Comparative Example

TABLE 9

| No. | Maximum absorption wavelength (λmax) | Color optical density | Fading speed (sec) | Evaluation of appearance (number of laminates having a defect) | Adhesion | Vickers hardness | Water absorption coefficient | Number of cracked laminates |
|---|---|---|---|---|---|---|---|---|
| Example 17 | 588 | 1.0 | 50 | 0 | 100 | 6.5 | 1.7 | 0 |
| Example 18 | 587 | 1.0 | 52 | 0 | 100 | 6.9 | 1.7 | 0 |
| Example 19 | 588 | 1.0 | 58 | 2 | 100 | 7.2 | 2.1 | 2 |
| Example 20 | 591 | 1.0 | 55 | 0 | 100 | 6.6 | 1.7 | 0 |
| Example 21 | 590 | 1.0 | 47 | 0 | 100 | 5.1 | 1.6 | 0 |
| Example 22 | 587 | 1.0 | 45 | 0 | 100 | 4.6 | 1.8 | 0 |
| Example 23 | 588 | 1.0 | 50 | 0 | 100 | 7.5 | 1.6 | 0 |
| Example 24 | 588 | 0.9 | 52 | 0 | 100 | 4.6 | 1.7 | 0 |
| Example 33 | 587 | 1.0 | 52 | 0 | 100 | 4.6 | 1.7 | 0 |
| C. Example 9 | 590 | 1.0 | 55 | 0 | 100 | 4.5 | 3.0 | 5 |
| C. Example 10 | 588 | 0.8 | 40 | 0 | 100 | 3.5 | 1.9 | 0 |
| C. Example 11 | 590 | 1.0 | 50 | 5 | 100 | 6.2 | 1.8 | 6 |

Example 25 (Lamination Method: Two-Stage Polymerization Technique)

20 parts by mass of M-1 as the component [A1], 15 parts by mass of TMPT and 15 parts by mass of D-TMPT as the component [A2], 20 parts by mass of BPE-500, 22 parts by mass of 14G, 5 parts by mass of GMA and 3 parts by mass of MA2 as the component [A3], 0.1 part by mass of PC1, 0.03 part by mass of PC2 and 0.1 part by mass of PC3 as the component (B), 1 part by mass of α-MS and 3 parts by mass of MSD as the component (C), 0.2 part by mass of HALS and 0.2 part by mass of HP as stabilizers which are other compounding agents (additives) and 1 part by mass of ND as a polymerization initiator were added and fully mixed together under agitation to obtain a photochromic curable composition for use in the two-stage polymerization technique. The amounts of these components are shown in Table 10.

This photochromic curable composition was injected into a mold sandwiched between a glass plate and a plastic lens substrate which is an allyl diglycol carbonate cured product having a refractive index of 1.50 by using a gasket made of an ethylene-vinyl acetate copolymer to carry out cast polymerization. This plastic lens substrate was alkali etched by using a 10% sodium hydroxide aqueous solution at 50° C. for 5 minutes and then fully rinsed with distilled water in advance.

Polymerization was carried out in an air furnace by gradually raising the temperature from 30° C. to 90° C. over 18 hours and keeping the temperature at 90° C. for 2 hours, and the glass sheet was removed after the end of polymerization to obtain a photochromic laminate having a 0.5 mm-thick photochromic layer of the photochromic curable composition and the 2 mm-thick plastic lens substrate adhered to the above layer. The obtained photochromic laminate was evaluated for photochromic properties, water absorption coefficient, crack test, Rockwell hardness, tensile strength, cloudiness and adhesion (2) like the photochromic cured product. The results are shown in Table 11.

[Evaluation of Specimen]

14) Adhesion (2)

Adhesion (2) was evaluated according to the existence or nonexistence of the peeled photochromic layer by carrying out a boiling test for one hour on the obtained laminate by using distilled water.

1: there is no difference in adhesion before and after the boiling test.

2: at least part of the laminate peels off.

Examples 26 to 32, Comparative Examples 12 to 14 (Lamination Method: Two-Stage Polymerization Technique)

Photochromic laminates were manufactured and evaluated in the same manner as in Example 25 except that photochromic curable compositions shown in Table 10 (Examples 26 to 32, Comparative Examples 12 to 14) were used. The results are shown in Table 11.

TABLE 10

| No. | Component [A1] (parts by mass) | Component [A2] (parts by mass) | Component [A3] (parts by mass) | Component (B) (parts by mass) | Component (C) (parts by mass) | Additive (parts by mass) | Initiator (parts by mass) |
|---|---|---|---|---|---|---|---|
| Ex. 25 | M-1(20) | TMPT(15)/ D-TMPT(15) | BPE-500(20)/14G(22)/ GMA(5)/MA2(3) | PC1(0.1)/ PC2(0.03)/PC3(0.1) | α-MS(1)/ MSD(3) | HALS(0.2)/ HP(0.2) | ND(1) |
| Ex. 26 | M-1(10) | TMPT(15)/ D-TMPT(20) | BPE-500(20)/14G(17)/ U4HA(10)/GMA(5)/MA2(3) | PC1(0.1)/ PC2(0.03)/PC3(0.1) | α-MS(1)/ MSD(3) | HALS(0.2)/ HP(0.2) | ND(1) |
| Ex. 27 | M-1(3) | TMPT(20) | BPE-500(30)/4G(17)/ 14G(20)/GMA(5)/MA2(3) | PC1(0.1)/ PC2(0.03)/PC3(0.1) | α-MS(1)/ MSD(3) | HALS(0.2)/ HP(0.2) | ND(1) |
| Ex. 28 | M-1(30) | D-TMPT(35) | BPE-500(20)/14G(7)/ GMA(5)/MA2(3) | PC1(0.1)/ PC2(0.03)/PC3(0.1) | α-MS(1)/ MSD(3) | HALS(0.2)/ HP(0.2) | ND(1) |
| Ex. 29 | M-1(47) | TMPT(15)/ D-TMPT(30) | BPE-500(3)/GMA(2)/ MA2(3) | PC1(0.1)/ PC2(0.03)/PC3(0.1) | α-MS(1)/ MSD(3) | HALS(0.2)/ HP(0.2) | ND(1) |
| Ex. 30 | M-1(50) | TMPT(15)/ D-TMPT(30) | GMA(2)/MA2(3) | PC1(0.1)/ PC2(0.03)/PC3(0.1) | α-MS(1)/ MSD(3) | HALS(0.2)/ HP(0.2) | ND(1) |
| Ex. 31 | M-2(20) | TMPT(15)/ D-TMPT(15) | BPE-500(25)/PMS1(10)/ 14G(10/GMA(2)/MA2(5) | PC1(0.1)/ PC2(0.03)/PC3(0.1) | α-MS(1)/ MSD(3) | HALS(0.2)/ HP(0.2) | ND(1) |
| Ex. 32 | M-3(20) | TMPT(20) | BPE-500(25)/PMS1(10)/14G(10) M90G(5)/GMA(5)/MA2(5) | PC1(0.1)/ PC2(0.03)/PC3(0.1) | α-MS(1)/ MSD(3) | HALS(0.2)/ HP(0.2) | ND(1) |
| C. Ex. 12 | — | TMPT(30) | BPE-500(35)/14G(27)/GMA(5)/ MA2(3) | PC1(0.1)/ PC2(0.03)/PC3(0.1) | α-MS(1)/ MSD(3) | HALS(0.2)/ HP(0.2) | ND(1) |
| C. Ex. 13 | M-1(20) | — | BPE500-(40)/14G(35)/ GMA(5)/MA2(3) | PC1(0.1)/ PC2(0.03)/PC3(0.1) | α-MS(1)/ MSD(3) | HALS(0.2)/ HP(0.2) | ND(1) |
| C. Ex. 14 | M-1(50) | TMPT(30)/ D-TMPT(20) | — | PC1(0.1)/ PC2(0.03)/PC3(0.1) | α-MS(1)/ MSD(3) | HALS(0.2)/ HP(0.2) | ND(1) |

Ex: Example, C. Ex.: Comparative Example

TABLE 11

| No. | Maximum absorption wavelength (λmax) | Color optical density | Fading speed (Sec) | L-scale Rockwell hardness (HL) | Water absorption coefficient (%) | Number of cracked laminates | Adhesion (2) | Tensile strength (kgf) | Cloudiness |
|---|---|---|---|---|---|---|---|---|---|
| Ex. 25 | 587 | 1.1 | 52 | 70 | 1.7 | 0 | 1 | 15 | 1 |
| Ex. 26 | 586 | 0.9 | 62 | 75 | 1.7 | 0 | 1 | 16 | 1 |
| Ex. 27 | 587 | 0.9 | 60 | 78 | 2.1 | 2 | 1 | 16 | 1 |
| Ex. 28 | 590 | 0.9 | 57 | 68 | 1.7 | 0 | 1 | 16 | 1 |
| Ex. 29 | 589 | 1.0 | 47 | 65 | 1.6 | 1 | 1 | 16 | 2 |
| Ex. 30 | 586 | 0.9 | 65 | 67 | 1.8 | 2 | 1 | 16 | 2 |
| Ex. 31 | 587 | 0.9 | 56 | 80 | 1.6 | 0 | 1 | 16 | 1 |
| Ex. 32 | 587 | 0.9 | 50 | 78 | 1.7 | 0 | 1 | 16 | 1 |
| C. Ex. 12 | 589 | 0.9 | 55 | 65 | 3.0 | 5 | 1 | 14 | 1 |
| C. Ex. 13 | 587 | 1.1 | 47 | 50 | 1.9 | 0 | 1 | 15 | 1 |
| C. Ex. 14 | 589 | 1.0 | 63 | 66 | 1.8 | 8 | 2 | 16 | 2 |

Ex.: Example, C. Ex.: Comparative Example

As obvious from the above Examples 25 to 32 and Comparative Examples 12 to 14, photochromic laminates obtained from the photochromic curable compositions of the present invention by the two-stage polymerization technique are excellent in not only photochromic properties but also water absorption coefficient, Rockwell hardness, crack, adhesion, tensile strength and cloudiness. In contrast to this, in Comparative Examples 12 to 14, photochromic laminates which satisfy all the physical properties such as water absorption coefficient, Rockwell hardness, crack, adhesion, tensile strength and cloudiness were not obtained.

EFFECT OF THE INVENTION

As described above, according to the present invention, a photochromic cured product whose appearance defect such as a crack is suppressed even when it is used under high-temperature and high-humidity conditions and which has excellent mechanical properties and photochromic properties can be obtained. A photochromic laminate which has high surface hardness and excellent photochromic properties and whose appearance defect such as a crack is suppressed even when it is used under high-temperature and high-humidity conditions can be obtained.

The invention claimed is:

1. A photochromic curable composition comprising (A) as a polymerizable (meth)acrylate component:

[A1] a polymerizable carbonate monomer represented by the following formula (1):

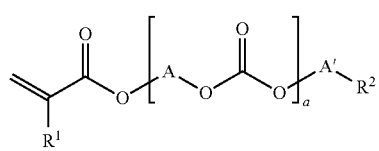

(1)

wherein A and A' are each a linear or branched alkylene group having 2 to 15 carbon atoms, "a" is an average value of 1 to 20, when there are a plurality of A's, A's may be the same or different, $R^1$ is a hydrogen atom or methyl group, and $R^2$ is a (meth)acryloyloxy group or hydroxyl group;

[A2] a polyfunctional polymerizable monomer represented by the following formula (2):

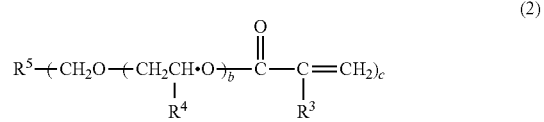

(2)

wherein $R^3$ is a hydrogen atom or methyl group, $R^4$ is a hydrogen atom or alkyl group having 1 to 2 carbon atoms, $R^5$ is a trivalent to hexavalent organic group having 1 to 10 carbon atoms, "b" is an average value of 0 to 3, "c" is an integer of 3 to 6; and

[A3] another polymerizable (meth)acrylate monomer different from the above components [A1] and [A2], and (B) a photochromic compound (B), wherein the polymerizable (meth)acrylate component (A) contains 5 to 50 mass % of the component [A1], more than 30 mass % to 70 mass % or less of the component [A2] and 1 mass % or more to less than 65 mass % of the component [A3] (the total content of the components [A1], [A2] and [A3] is 100 mass %), and the photochromic compound (B) is contained in an amount of 0.0001 to 10 parts by mass based on 100 parts by mass of the polymerizable (meth)acrylate component (A).

2. The photochromic curable composition according to claim 1, wherein the component [A3] contains [A3a] a bifunctional polymerizable monomer represented by the following formula (3):

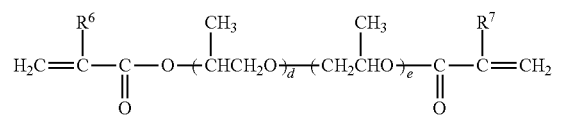

(3)

wherein $R^6$ and $R^7$ are each a hydrogen atom or methyl group, "d" and "e" are each an integer of 0 or more, with the proviso that when both $R^6$ and $R^7$ are methyl groups, (d+e) is an average value of 2 or more to less than 7, when $R^6$ is a methyl group and $R^7$ is a hydrogen atom, (d+e) is an average value of 2 or more to less than 5, and when both $R^6$ and $R^7$ are hydrogen atoms, (d+e) is an average value of 2 or more to less than 3.

3. The photochromic curable composition according to claim 2, wherein the component [A3] contains the component [A3a] in an amount of 20 to 100 mass % based on 100 mass % of the component [A3].

4. The photochromic curable composition according to claim 1, wherein the component [A3] contains [A3b] a bifunctional polymerizable monomer represented by the following formula (4):

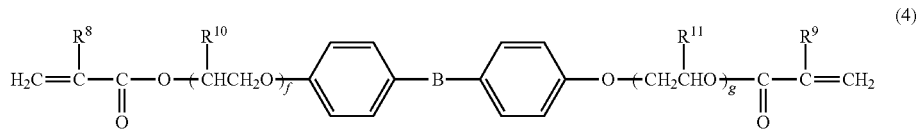

wherein $R^8$ and $R^9$ are each a hydrogen atom or methyl group, $R^{10}$ and $R^{11}$ are each a hydrogen atom or methyl group, B is any one of groups represented by the following formulas:

—O—,  —S—,  —S($O_2$)—,  —C(O)—,

—$CH_2$—,  —C(H)=C(H)—,  —C($CH_3$)$_2$—  and

—C($CH_3$)($C_6H_5$)— and "f" and "g" are each an integer of 1 or more, with the proviso that when both $R^8$ and $R^9$ are methyl groups, (f+g) is an average value of 2 or more to less than 7, when $R^8$ is a methyl group and $R^9$ is a hydrogen atom, (f+g) is an average value of 2 or more to less than 5, and when both $R^8$ and $R^9$ are hydrogen atoms, (f+g) is an average value of 2 or more to less than 3.

5. The photochromic curable composition according to claim 4, wherein the component [A3] contains the component [A3b] in an amount of 20 to 100 mass % based on 100 mass % of the component [A3].

6. The photochromic curable composition according to claim 1, wherein the component [A3] contains [A3c] a bifunctional polymerizable monomer represented by the following formula (14):

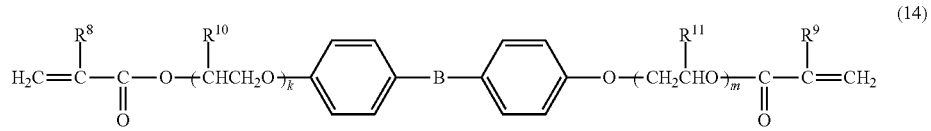

wherein $R^8$ and $R^9$ are each a hydrogen atom or methyl group, $R^{10}$ and $R^{11}$ are each a hydrogen atom or methyl group, B is any one of groups represented by the following formulas:

—O—,  —S—,  —S($O_2$)—,  —C(O)—,

-continued

—$CH_2$—,  —C(H)=C(H)—,  —C($CH_3$)$_2$—  and

—C($CH_3$)($C_6H_5$)— and "k" and "m" are each an integer of 1 or more, with the proviso that when both $R^8$ and $R^9$ are methyl groups, (k+m) is an average value of 7 to 30, when $R^8$ is a methyl group and $R^9$ is a hydrogen atom, (k+m) is an average value of 7 to 25, and when both $R^8$ and $R^9$ are hydrogen atoms, (k+m) is an average value of 7 to 20.

7. The photochromic curable composition according to claim 6, wherein the component [A3] contains the component [A3c] in an amount of 30 to 100 mass % based on 100 mass % of the component [A3].

8. The photochromic curable composition according to claim 1 which further comprises (C) a polymerizable monomer having a polymerizable group different from a (meth)acrylate group in an amount of 0.1 to 20 parts by mass based on 100 parts by mass of the component (A).

9. The photochromic curable composition according to claim 1, wherein the component (B) contains a photochromic compound having an indeno[2,1-f]naphtho[1,2-b]pyran skeleton.

10. A photochromic cured product obtained by curing the photochromic curable composition of claim 1.

11. A photochromic laminate having the photochromic cured product of claim 10 on a plastic lens substrate.

* * * * *